(12) United States Patent
Yahil

(10) Patent No.: US 10,068,327 B2
(45) Date of Patent: Sep. 4, 2018

(54) METHOD AND SYSTEM FOR STATISTICAL MODELING OF DATA USING A QUADRATIC LIKELIHOOD FUNCTIONAL

(71) Applicant: Siemens Medical Solutions USA, Inc., Malvern, PA (US)

(72) Inventor: Amos Yahil, Stony Brook, NY (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 842 days.

(21) Appl. No.: 14/490,577

(22) Filed: Sep. 18, 2014

(65) Prior Publication Data

US 2015/0081262 A1   Mar. 19, 2015

Related U.S. Application Data

(60) Provisional application No. 61/879,629, filed on Sep. 18, 2013.

(51) Int. Cl.
*G06T 5/00* (2006.01)
*G06T 7/00* (2017.01)
*G06F 17/18* (2006.01)

(52) U.S. Cl.
CPC ............ *G06T 7/0012* (2013.01); *G06F 17/18* (2013.01); *G06T 2207/10072* (2013.01); *G06T 2207/10081* (2013.01); *G06T 2207/10104* (2013.01); *G06T 2207/10108* (2013.01); *G06T 2207/10116* (2013.01)

(58) Field of Classification Search
CPC ...................... G06F 17/11; G06F 17/18; G06F 2207/10116; G06T 7/0012
See application file for complete search history.

(56) References Cited

U.S. PATENT DOCUMENTS

| | | | |
|---|---|---|---|
| 5,912,993 | A | 6/1999 | Puetter et al. |
| 6,353,688 | B1 | 3/2002 | Puetter et al. |

(Continued)

FOREIGN PATENT DOCUMENTS

| | | |
|---|---|---|
| WO | 2002067201 A1 | 8/2002 |
| WO | 2008147416 A1 | 12/2008 |

OTHER PUBLICATIONS

Couchy, A., "Oeuvres Completes" (1821), series 2, vol. 3, p. 373.*

(Continued)

*Primary Examiner* — Brian W Wathen

(57) ABSTRACT

A method and system are provided for constructing a model of a target object in a computer processor by receiving an input signal from a source, the input signal containing data describing the target object and a plurality of parameters, the input signal having a noise portion; selecting a group of initial parameters, estimating a nonparametric probability distribution function (pdf) comprising a linear combination of a set of square-integrable basis functions, computing a quadratic likelihood functional (QLF), evaluating a fit of the initial parameters to the data based on the QLF, iteratively optimizing the QLF by selecting a new group of parameters and evaluating the fit of the new group of parameters into a predetermined condition is achieved. Once an acceptable fit is achieved, an output of a model of the target object constructed using optimized parameters can be displayed.

20 Claims, 11 Drawing Sheets

(56) References Cited

U.S. PATENT DOCUMENTS

| | | | |
|---|---|---|---|
| 6,490,374 B2 | 12/2002 | Puetter et al. | |
| 6,507,633 B1 | 1/2003 | Elbakri et al. | |
| 6,895,125 B2 | 5/2005 | Puetter et al. | |
| 6,993,204 B1 | 1/2006 | Yahil et al. | |
| 7,328,182 B1 | 2/2008 | Yahil et al. | |
| 8,014,580 B2 | 9/2011 | Vija et al. | |
| 8,086,011 B2 | 12/2011 | Vija et al. | |
| 8,090,179 B2 | 1/2012 | Vija et al. | |
| 8,160,340 B2 | 4/2012 | Vija et al. | |
| 8,396,313 B2 | 3/2013 | Puetter | |
| 8,675,983 B2 | 3/2014 | Yahil | |
| 2009/0051542 A1* | 2/2009 | Jung | G06F 3/011 340/573.1 |
| 2009/0110254 A1 | 4/2009 | Vija et al. | |
| 2010/0014730 A1* | 1/2010 | Hahn | G06T 5/50 382/131 |
| 2012/0263393 A1 | 10/2012 | Yahil | |
| 2013/0179130 A1* | 7/2013 | Zhandov | G06F 17/50 703/2 |
| 2013/0230229 A1* | 9/2013 | Kosarev | G06T 7/41 382/132 |
| 2014/0007014 A1* | 1/2014 | Ouzts | G06F 3/0481 715/835 |
| 2014/0234009 A1* | 8/2014 | Duesterhoft | B43K 29/08 401/194 |
| 2015/0066346 A1* | 3/2015 | Cheatham, III | G08G 1/166 701/301 |

OTHER PUBLICATIONS

Dirac, P., "Principles of Quantum Mechanics" (1958), 4th Edition, Oxford: Clarendon Press, p. 58.*

Poisson, S.D., "Recherches sur la Probabilite Des Jugements en Matiere Criminelle et en Matiere Civile, Precedees des Regles Generales du Culcul des Proabilites" (1937), pp. 1-415.*

Schwarz, H.A., "Uber ein Flachen kleisten Flacheninhalts betreffendes Problem der Variationsrechnung" (1888), Acta Societatis Scientiarum Fennicae 45, pp. 318-361.*

Voroni, G., "Nouvelles Applications des Parametres Continus a la Theorie des Formes Quadratiques" (1908), Journal fur die Reine und Angewandte Mathematik 133, pp. 198-287.*

Gauss, CF, "Theoria Motus Corporum Coelestium in sectionibus conicis solem ambientum" (1809), English Translation 1963 (New York: Dover), pp. 1-104.*

Vaseghi, "Advanced Digital Signal Processing and Noise Reduction," 2nd Edition (2000), John Wikley & Sons, pp. 89-142 [retrieved from http://onlinelibrary.wiley.com/book/10.1002/0470841621].*

Ahn S. & Fessler JA 2003, "Globally convergent image reconstruction for emission tomography using relaxed ordered subsets algorithms", IEEE Trans. Med. Imag., 22, 613.

Biemond J., Lagendijk RL & Mersereau RM 1990, "Iterative Methods for Image Deblurring". Proc. IEEE, 78, 856.

Du Q., Faber V., & Gunzburger M. 1999, "Centroidal Voronoi Tessellations: Applications and Algorithms", SIAM Rev., 41, 637.

Fisher RA 1912, "On an Absolute Criterion for Fitting Frequency Curves", Messenger Math., 41, 155.

Fisher RA 1922, "On the Mathematical Foundations of Theoretical Statistics", Phil. Trans. Roy. Soc. A, 222, 309.

Fox L., Huskey HD, & Wilkinson JH 1948, "Notes on the Solution of Algebraic Linear Simultaneous Equations", Quart. J. Mech. Appl. Math., 1, 149.

Golub GH & Van Loan CF 1996, Matrix Computations, 3rd ed. (Baltimore: Johns Hopkins University Press).

Hestenes MR & Stiefel E 1952, "Methods of Conjugate Gradients for Solving Linear Systems", J. Res. Nat. Bur. Standards, 49, 409.

Ju L, Du Q & Gunzburger M 2002, "Probabilistic Methods for Centroidal Voronoi Tessellations and their Parallel Implementations", Parallel Computing, 28, 1477.

Liu Y, Wang W, Levy B, Sun F, Yan D-M, Lu L, & Yang C 2009, "On Centroidal Voronoi Tessellation—Energy Smoothness and Fast Computation", ACM Trans. Graphics 28, Article 101.

Pina RK & Puetter RC 1993, "Bayesian Image Reconstruction: the Pixon and Optimal Image Modeling", Publ. Aston. Soc. Pacific 105, 630.

Press WH, Teukolsky SA, Vetterling WT & Flannery BP 2007, Numerical Recipes, 3rd ed. (Cambridge: Cambridge University Press).

Puetter RC, Gosnell TR & Yahil A 2005, "Digital Image Reconstruction: Deblurring and Denoising", Annu. Rev. Astron. Astrophys., 43, 139.

Puetter RC & Yahil A 1999, "The Pixon Method of Image Reconstruction," Astronomical Data Analysis Software and Systems VIII, Mehringer DM, Plante RL & Roberts DA, eds., ASP Conference Series, 172, 307.

Saad Y 2003, Iterative Methods for Sparse Linear Systems, 2nd ed. (Philadelphia: SIAM).

Ashburner John et al: "Spatial Normalization using Basis Functions" In: "Human Brain Function 2nd Edition", 2004, Elsevier, XP055386262 ; ISBN: 978-0-12-264841-0; pp. 1-26.

Erdogan H et al: "Accelerated monotonic algorithms for transmission tomography", Image Processing, 1998. ICIP 98. Proceedings. 1998 International Conference on Chicago, IL, USA Oct. 4-7, 1998, Los Alamitos, CA, USA,IEEE Comput. Soc, US, vol. 2, pp. 680-684, XP010308525; DOI: 10.1109/ICIP.1998.723620 ISBN: 978-0-8186-8821-8.

Extended European Search Report for Corresponding Application No. 14846368.0 dated Jul. 5, 2017.

Forney, G. D. J. R. "Maximum-likelihood sequence estimation of digital sequences in the presence of intersymbol interference." IEEE Transactions on Information theory 18.3 (1972): 363-378.

Hu Y et al: "Sparse reconstruction from a limited projection number of the coronary artery tree in X-ray rotational imaging", Biomedical Imaging (ISBI), 2012 9th IEEE International Symposium on, IEEE, pp. 804-807, XP032199128; DOI: 10.1109/ISBI.2012.6235670; ISBN: 978-1-4577-1857-1.

International Search Report for Corresponding Application No. PCT/US2014/056392 dated Dec. 31, 2014.

McCoy, Airlie J., et al. "Likelihood-enhanced fast translation functions." Acta Crystallographica Section D: Biological Crystallography 61.4 (2005): 458-464.

Tsoumpas Charalampos et al: "A survey of approaches for direct parametric image reconstruction in emission tomography", Medical Physics, AIP, Melville, NY, US, A vol. 35, No. 9, pp. 3963-3971, XP012116228 , ISSN: 0094-2405, DOI: 10.1118/1.2966349.

* cited by examiner

METHOD AND SYSTEM FOR STATISTICAL MODELING OF DATA USING A QUADRATIC LIKELIHOOD FUNCTIONAL

RELATED APPLICATIONS

This application claims the benefit of the priority of U.S. Provisional Application No. 61/879,629, filed Sep. 18, 2013.

FIELD OF THE INVENTION

The present invention relates to a method for statistical estimation for prediction of data and more particularly to a quadratic likelihood functional to replace the log-likelihood function, especially in non-asymptotic statistical estimation problems in which the number of estimated coefficients is comparable to or larger than the number of data points.

BACKGROUND OF THE INVENTION

Measured data, whether it is from detected images, received signals, polls, searches, or any other data collection method, are likely to be subject to noise or uncertainty. Methods are necessary to improve the ability to extract as much information from the data as possible without over-interpretation of the data.

Statistical estimation is used when information needs to be extracted from noisy data, i.e., data with unknown random components that change from one realization of the data to another and can only be characterized statistically. The goal of statistical estimation is to model the signal in the data, i.e., the reproducible components that do not change from one data realization to the next. The signal is modeled as a function of parameters, whose values are determined by a fit of the model to the data.

This process of modeling noisy data finds broad application, including, without limitation, tracking objects, signal processing, imaging (including medical imaging such as CT, SPECT, PET, X-ray), market research, supply-chain management, inventory control, and financial markets, to name a few. The information extracted from historical data is often used to predict future behavior and/or the risk associated with it. As long as the underlying model is correct, the quality of the prediction and/or risk analysis are determined by the accuracy of the estimation.

It should be pointed out that statistical estimation is related to the broader field of optimization, which also includes non-statistical methods, in which noisy data are not involved, and optimization is just a matter of finding the best parameters.

Statistical estimation dates back two centuries to the method of least squares (Gauss 1809), which later evolved into the maximum-likelihood (ML) method (Fisher 1912, 1922). Given the probability distribution function (pdf) of statistically independent data, the ML method maximizes the conditional probability of the data, given the model, or, equivalently, minimizes the log-likelihood function (LLF)

$$L = 2 \int dx \left[ f(x, \theta) - \ln(f(x, \theta)) \sum_i \delta(x - x_i) \right] (LLF) \quad (1)$$

Here, x is an n-dimensional space, any of whose dimensions may be continuous, discrete, or even categorical, $\theta$ are the model parameters, $x_i$ are the positions of the observations, $f(x,\theta)$ is the pdf, and $\delta$ is the n-dimensional Dirac (1958) delta function. The integral sign is understood to designate an integral over the continuous dimensions and a sum over the discrete and categorical dimensions, although the integral may be approximated by a sum in practice.

In many applications the integral normalization of the pdf is fixed, typically to unity. In that case the first term on the right hand side of Eq. (1) is constant and may be omitted, yielding $$L = -2 \sum_i \ln(f(x_i, \theta)) (LLF \text{ with fixed integral } pdf) \quad (2)$$

The extra term is included in Eq. (1) to allow for the case in which the normalization of the observations is itself of interest, e.g., the rate of events observed by a detector or the rate of sale of a product. In that case, Eq. (1) is the unbinned LLF of the Poisson (1837) distribution.

The ML method has three distinct advantages:
1. It directly estimates the probability distribution function (pdf) without requiring the data to be binned.
2. In the asymptotic limit in which the number of data points largely exceeds the number of parameters, the variances of the parameters estimated by the ML method are smaller than or equal to those of competing statistics. In this asymptotic limit, the variance of an estimated parameter is inversely proportional to the number of data points used to estimate it. For a given accuracy, therefore, the ML method allows a parameter to be estimated from a smaller sample than other methods, hence its higher sampling efficiency. The efficiency of an alternative estimator is, in fact, defined as the ratio between the ML variance and the variance of the other estimator. This sets the efficiency of ML estimators to unity, by definition, and those of competitors to fractions smaller than or equal to unity.
3. The covariance matrix of the uncertainties in the estimated parameters is readily computed in the asymptotic limit from the information matrix (Fisher 1922), the Hessian matrix of second-order partial derivatives of the LLF at its minimum.

In the non-asymptotic regime, when the number of parameters is comparable to the number of data points or larger, it is necessary to constrain the solution to avoid having the model treat random statistical noise as reproducible signal. (See, e.g., the review by Puetter, Gosnell & Yahil 2005.) A common practice is to represent the signal as a generic linear "nonparametric" combination of basis functions, whose coefficients are to be estimated. (There may be additional nonlinear parameters characterizing the basis functions.) The goal is to have the estimation both provide the values of the significant coefficients and constrain the insignificant coefficients by zeroing, or at least minimizing them. In that way, it is hoped to separate signal from noise.

The most reliable parameterization is the most conservative one, which seeks the simplest underlying parameters consistent with the input data, also known as minimum complexity or Ockham's razor. Simplicity is context-dependent, but for most continuous applications, the simplest solution is the smoothest one. The PIXON® method achieves this solution by imposing the maximum, spatially adaptive smoothing permitted by the data (Piña & Puetter 1993; Puetter & Yahil 1999; Puetter et al 2005; U.S. Pat. Nos. 5,912,993, 6,353,688, 6,490,374, 6,895,125, 6,993,204, 8,014,580, 8,086,011, 8,090,179, 8,160,340, 8,396,313; US Patent Publication 2012/0263393, each of which is incorporated herein by reference). The ALGEBRON™ method is an equivalent technique designed for discrete problems that are not anchored in a continuous space, such as prediction and risk assessment in financial systems (U.S. Pat. No. 7,328,182).

Ever since the pioneering work of Fisher (1912, 1922), the common thread in statistical estimation has been the use of ML and its LLF estimator. However, ML has a number of serious drawbacks, which can limit its usefulness:

1. ML is only asymptotically efficient. When additional constraints are applied to the solution in the non-asymptotic regime, the efficiency of the ML method is no longer assured.
2. The covariance matrix of the parameters cannot be estimated from the information matrix in the non-asymptotic regime. The unrestricted ML method, in fact, often creates significant artifacts by amplifying noise treated as signal. Constraining the solution can reduce these artifacts as discussed above, but the residual accuracy is then largely determined by the constraints and not by the information matrix.
3. The LLF is not, in general, quadratic in the parameters θ, and the computational effort to determine the parameters may not be worth the extra asymptotic sampling efficiency, particularly for large-scale problems.
4. The gradient of the LLF with respect to the parameters has a term that is inversely proportional to the pdf $f(x,\theta)$ $$\nabla_\theta L \equiv 2 \int dx \nabla_\theta f(x, \theta) \left[ 1 - f(x, \theta)^{-1} \sum_i \delta(x - x_i) \right] (LLF \text{ gradient}) \quad (3)$$

Data in regions of low pdf, possibly including outliers (rogue data), can then lead to large biases and/or fluctuations in the estimates of the parameters.

Given the above limitations, the ML method does not have a particular advantage over other estimators for nonparametric estimations in the non-asymptotic regime. Accuracy and computational efficiency outweigh the ML "advantages" that no longer exist.

BRIEF SUMMARY OF THE INVENTION

According to the present invention, a method is provided for modeling input data having noise or other uncertainties in image or signal reconstruction, data analysis and the like, especially where the number of parameters is comparable to the number of data points or larger. In particular, a quadratic likelihood functional (QLF) is used to replace the log-likelihood function in statistical estimation problems. It is shown that (a) the QLF is Fisher consistent and therefore suitable for statistical estimation, and (b) its efficiency in the asymptotic limit is only 10-15% smaller than that of the log-likelihood function for most problems of interest. It is then pointed out that the log-likelihood function has no innate advantage in the non-asymptotic regime, where the accuracy and computational efficiency of the QLF, and its lower sensitivity to low-probability events, make it an ideal estimator. The following detailed description provides explicit procedures to build and optimize the QLF, including efficient integration of functions over data space. Examples of potential applications of this new technology are provided.

Like the LLF, the QLF does not require the data to be binned, and its quadratic form simplifies the computation of the solution and the application of constraints and is less sensitive to data in low-pdf regions. Even in the asymptotic limit, the QLF does not lag far behind the LLF in sampling efficiency for commonly used basis functions. The advantage of the QLF comes across clearly when considering a linear nonparametric pdf.

While the present disclosure focuses on statistical estimation, it will be readily apparent to those in the art that some techniques presented here may be applicable to general optimization problems.

In one aspect of the invention, a method and system are provided for constructing a model of a target object in a computer processor by receiving an input signal from a source, the input signal containing data describing the target object and a plurality of parameters, the input signal having a noise portion; selecting a group of initial parameters, estimating a nonparametric probability distribution function (pdf) comprising a linear combination of a set of square-integrable basis functions, computing a quadratic likelihood functional (QLF), evaluating a fit of the initial parameters to the data based on the QLF, iteratively optimizing the QLF by selecting a new group of parameters and evaluating the fit of the new group of parameters into a predetermined condition is achieved. Once an acceptable fit is achieved, an output of a model of the target object constructed using optimized parameters can be displayed.

In another aspect of the invention, a method for generating a reconstructed image of a target object from an input signal having a data component and a noise component, comprises: causing a computer to execute instructions for: receiving the input signal from an image source, the input signal comprising a plurality of parameters; selecting a group of initial parameters from the plurality of parameters; estimating a nonparametric probability distribution function (pdf) comprising a linear combination of a set of square-integrable basis functions; computing a quadratic likelihood functional (QLF) of the form $$L = \int dx \left[ \frac{1}{2} f(x, \theta)^2 - f(x, \theta) \sum_i \delta(x - x_i) \right],$$

where θ represents the parameters, x represents the observations, and $f(x,\theta)$ is the pdf; evaluating a fit of the initial parameters to the data based on the QLF; iteratively optimizing the QLF by selecting a new group of parameters and evaluating the fit of the new group of parameters into a predetermined condition is achieved; and generating an output comprising a display of reconstructed image of the target object based on the optimized parameters. In some embodiments, the input signal comprises first plane image data and second plane image data, wherein the steps of selecting, estimating, computing, evaluating and iteratively optimizing the QLF are performed for each of the first plane image data the second plane image data, and where generating an output comprises displaying a three-dimensional image of the target object.

In still another aspect of the invention, a system for modeling of data describing a target object contained in an input signal, includes: a computer-readable medium; a parameter optimization processor coupled to the computer-readable medium; and a communication interface coupled to the parameter optimization processor and adapted to receive and transmit electronic representations of reconstructed models to and from the parameter optimization processor, respectively, the computer-readable medium having stored thereon software instructions that, when executed by the parameter optimization processor, cause the parameter optimization processor to perform operations including:
receive the input signal from a source configured to collect object data; generate a group of initial parameters corresponding to the object data; estimate a nonparametric probability distribution function comprising a linear combination of a set of square-integrable basis functions; compute a quadratic likelihood functional (QLF) of the form $$L = \int dx \left[ \frac{1}{2} f(x, \theta)^2 - f(x, \theta) \sum_i \delta(x - x_i) \right],$$

where $\theta$ represents the parameters, x represents the positions of the observations, and $f(x, \theta)$ is the pdf; evaluate a fit of the initial parameters to the data based on the QLF; iteratively optimize the QLF by selecting a new group of parameters and evaluating the fit of the new group of parameters into a predetermined condition is achieved; and generate an output comprising a model of the target object constructed using optimized parameters. In some embodiments, the data comprises weights $w_i$ and the QLF has the form $$L = \int dx \left[ \frac{1}{2} f(x)^2 - f(x) \sum_i w_i \delta(x - x_i) \right].$$

The system may further comprise software instructions for calculating a source term using the data and basis functions. The QLF may be obtained by computing a Gram matrix using the basis functions; and combining the Gram matrix, the parameters and the source term to produce the QLF. In some embodiments, the input signal is image data and the output comprises a 2D, 3D or 4D representation of the target object displayed at a graphical user interface. The image data may be selected from the group consisting of X-ray, CT, emission tomography, SPECT and PET and the target object is a body part of a patient. The image data may be taken in at least two planes, so that the output comprises a 3D representation. In some embodiments, the image data is taken in a least two planes and further comprises time, so that the output comprises a 4D representation.

In yet another aspect of the invention, a method is provided for generating a model from input data using statistical estimation, wherein the improvement comprises replacing a log-likelihood function (LLF) with a quadratic likelihood functional (QLF) to optimize parameters for generating the model.

DETAILED DESCRIPTION

Before describing aspects of the present invention, it may be useful to provide a brief description of a suitable computing system environment 100 (FIG. 1) on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general-purpose or special-purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephone systems, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. Those skilled in the art can implement the description and/or figures herein as computer-executable instructions, which can be embodied on any form of computer readable media discussed below.

The invention may also be practiced in distributed computing environments where tasks are performed by remote processing devices that are linked through a communications network. In a distributed computing environment, program modules may be located in both local and remote computer storage media including memory storage devices.

Figure 1:
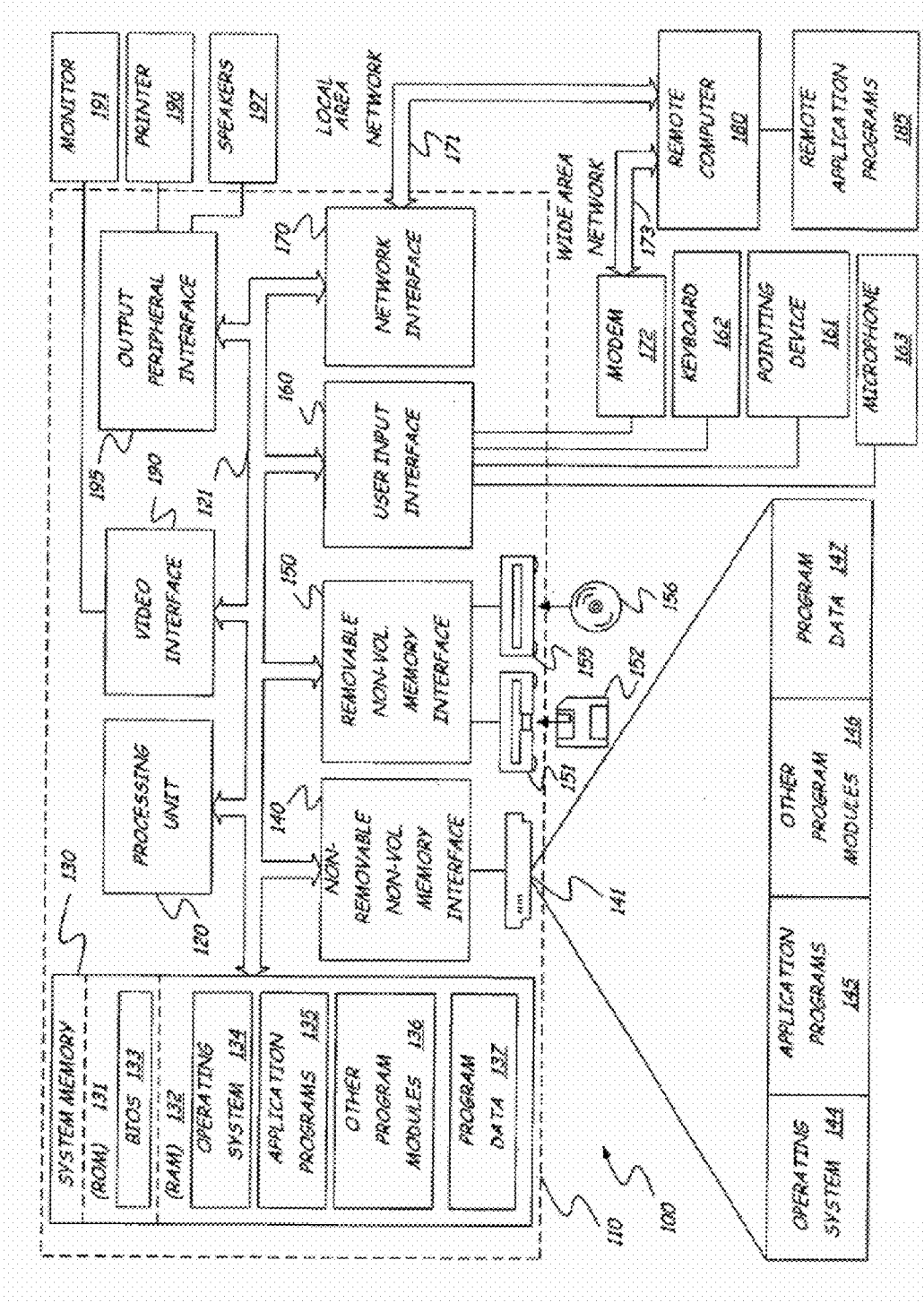
FIG. 1 is a block diagram of a general computing environment in which the present invention can be practiced.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media ("non-transitory computer-readable media.") By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163 (which also can represent input provided through a telephone), and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 5:
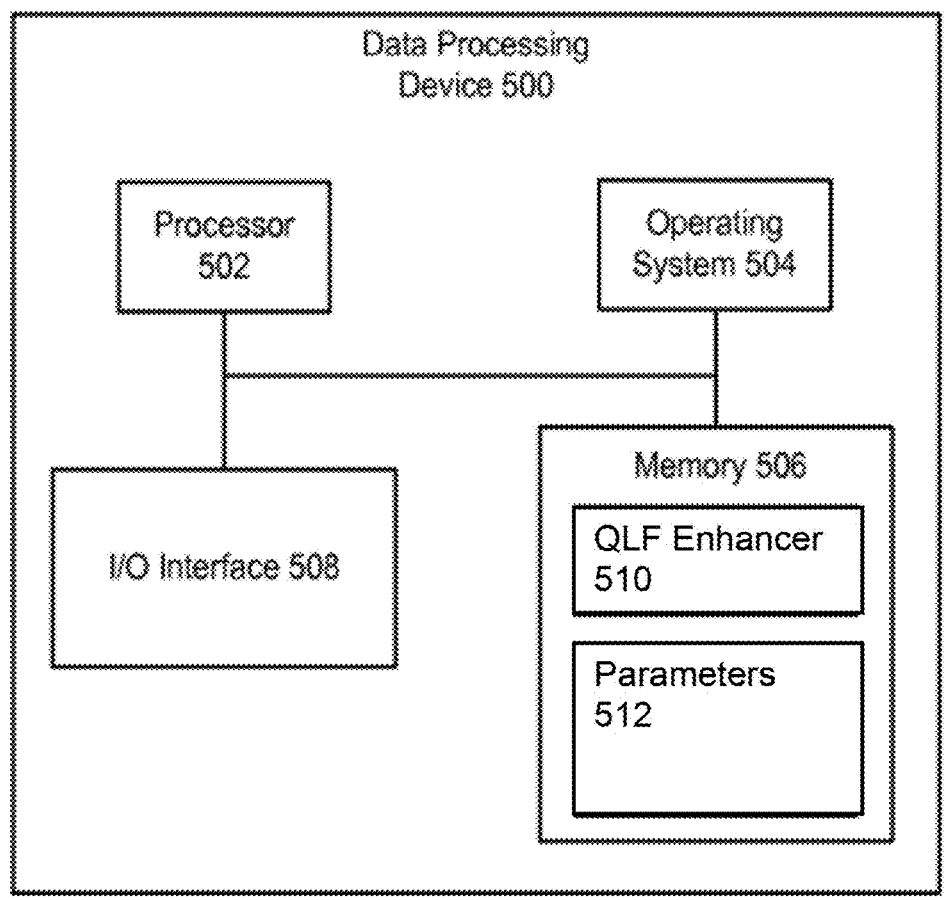
FIG. 5 is a block diagram of an exemplary statistical estimation system in accordance with at least one embodiment of the invention.

FIG. 5 is a simplified block diagram of an example statistical estimation system 500 that can be used to construct an accurate model of the input image, signal or other data in accordance with at least one embodiment. The system 500 includes a processor 502, an operating system 504, memory 506 and an I/O interface 508. The memory 506 can include a QLF enhancer 510 and a section for storage of parameter data 512 and data used to optimize parameters using the QLF enhancer 510.

In operation, the processor 502 may execute the parameter estimator 510 stored in the memory 506. The QLF enhancer 510 can include software instructions that, when executed by the processor, cause the processor to perform operations for estimating parameters in accordance with the present disclosure. The QLF enhancer 510 can operate in conjunction with the operating system 504 and utilize the parameter data 512 as described herein to generate outputs of the resulting models, i.e., reconstructed data, for display at the I/O interface 508. Examples of reconstructed data include, but are not limited to images, plots, graphs, etc. Specific illustrative examples are provided in § 12 below.

The following detailed description is organized to first show that the quadratic likelihood functional is statistically consistent and therefore suitable for statistical estimation. The log-likelihood function is shown to possess no innate advantage in the non-asymptotic regime, and the accuracy and computational efficiency of the quadratic likelihood functional make it the ideal estimation tool. Explicit procedures are provided to build and optimize the quadratic likelihood functional, including efficient integration of functions over data space.

The following description uses a number of acronyms which, for the reader's convenience, are listed in Table 1.

TABLE 1

Glossary of Acronyms

| | |
|---|---|
| CCD | charge-coupled device |
| CG | conjugate gradient |
| CT | computed tomography |
| CVT | centroidal Voronoi tessellation |
| DSA | digital subtraction angiography |
| GOF | goodness of fit |
| LLF | log-likelihood function |
| ML | maximum likelihood |
| MRI | magnetic resonance imaging |
| QLF | quadratic likelihood functional |
| pdf | probability distribution function |
| PCG | preconditioned conjugate gradient |
| PET | positron emission tomography |
| SPECT | single-photon emission computed tomography |
| SPET | single-photon emission tomography |

As used herein, "signal" means data configured in a digital format so as to be uploaded into and interpreted by a computer processor. Examples of signals include, but are not limited to, digital image data, communication transmissions, industrial measurements, market research data, supply-chain management data, inventory control, and financial markets, etc., any of which may include within the signal a noise component, the removal of which is desirable for optimizing the result of analysis of the data.

As used herein, "noise" means an undesirable component that may be included in a signal as a result of measurement/ receiver instrument limitations, interference (e.g., atmospheric, electromagnetic, mechanical or other) between the target object and the signal detector/receiver, and any other form of uncertainty that may be incorporated or introduced into a non-enhanced signal and which may detract from the ability to generate a desired quality output representation that accurately reflects the data contained in the input.

As used herein, a "target" or, alternatively, "target object", refers to an item that is described by the data. Where the data is image data, the target is the feature of interest, for example, an internal organ in a body, a geological structure, an astronomical object, or any structure about which information may be gained using detected signals. Where the data is market research data, the target may be the population about or from which the data is collected.

For clarity, this detailed description of the inventive technique will be broken into sections. The following provides a table of contents of the sections:
1. Quadratic Likelihood Function (QLF)
2. Demonstration of Fisher consistency
3. Asymptotic Efficiency
4. Linear Nonparametric Probability Density Function
5. Weighted Quadratic Likelihood Functional
6. Nonuniformity Correction
7. Background
8. Optimization of the QLF
9. Preconditioner
10. Nonlinear pdf
11. Numerical Integration
12. Examples:
   i. Sparse Signal Detection
   ii. Digital Mammography
   iii. Angiography
   iv. Computed Tomography
   v. Emission Tomography

1. QUADRATIC LIKELIHOOD FUNCTIONAL (QLF)

The LLF has the advantage of asymptotic efficiency, but is generally difficult to optimize. In contrast, the inventive alternative quadratic likelihood functional (QLF) is always quadratic but is not an LLF. The advantage of the QLF is its computational convenience, obtained at the expense of some loss of asymptotic efficiency. As in the case of the LLF, the QLF does not require data binning, and is given by $$L = \int dx \left[ \frac{1}{2} f(x, \theta)^2 - f(x, \theta) \sum_i \delta(x - x_i) \right], (QLF) \quad (4)$$

where θ represents the parameters that are used to construct the model of the data, x represents It is important to emphasize the difference between the QLF and an LLF of data whose noise follows a Gaussian pdf. The QLF is quadratic in the pdf, while the LLF is logarithmic. It also happens that the logarithms of Gaussian pdf's are quadratic in their mean values. (They are not quadratic in the standard deviations, i.e., widths, of the bell-shaped Gaussian pdf's.) If the parameters of interest are the Gaussian means, then the Gaussian LLF is a quadratic function of these parameters, and the ML method ends up being a least squares problem. The QLF of a Gaussian pdf, by contrast, is an exponential function of the means.

On the other hand, if the pdf is linear in its parameters, i.e., it is a linear combination of basis functions whose amplitudes are the sought parameters (see § 3 and § 4), then the QLF, which is quadratic in the pdf, is also quadratic in the parameters. The LLF of a linear pdf, on the other hand, is a logarithmic function of the amplitudes.

Thus, a Gaussian LLF and a QLF of a linear pdf both end up as quadratic functions of their respective parameters, and similar techniques can be applied to solve for the parameters. However, their underlying noise patterns are completely different and mutually exclusive. Parameter estimation of problems with a Gaussian pdf can and should be pursued using an LLF, while linear pdf's are better treated with a QLF.

Another way to state the difference between the Gaussian LLF and the linear QLF is to note that the LLF is used when measuring some physical quantity, while the QLF is used to measure the rate of events. Of course, one can also count events in bins and then use a Poisson LLF estimator, Eq. (1). Indeed, the Poisson pdf approximates a Gaussian distribution for high counts, and the counts can then be viewed as a physical quantity to measure, however, this approach becomes very problematic at low counts. That is where the QLF provides an alternative statistical estimation method using unbinned data.

2. FISHER CONSISTENCY

Both the LLF and QLF yield the same fully unconstrained estimate of the pdf. Varying Eqs. (1) and (4) with respect to $f$, yields, respectively, $$\delta L = \int dx \delta f \left[ 1 - f(x)^{-1} \sum_i \delta(x - x_i) \right] (LLF \text{ variation}) \quad (5)$$

and $$\delta L = \int dx \delta f \left[ f(x) - \sum_i \delta(x - x_i) \right] (QLF \text{ variation}). \quad (6)$$

Since the variant $\delta f$ is arbitrary, it follows that the two expressions in square brackets must be identically zero, which yields the same solution for both equations $$\hat{f}(x) = \sum_i \delta(x - x_i) (LLF \text{ and } QLF \text{ fully unconstrained } pdf). \quad (7)$$

The fully unconstrained pdf is of little practical interest because it includes all the random statistical fluctuations, which change from one set of observations to another. Consider therefore next a piecewise constant pdf. An analogous derivation shows that the minimization of both estimators again yields the same estimated pdf: the frequency density in bins corresponding to the regions of constant pdf:

$$\hat{f}_K = N_K/V_K, (LLF \text{ and } QLF \text{ piecewise-constant pdf}), \quad (8)$$

where $N_K$ is the number of observations (count) in bin K and $V_K$ is its volume.

The above discussion also shows that both the LLF and QLF are Fisher (1922) consistent, i.e., they yield the correct pdf as the sample is indefinitely increased. This is an important conclusion, because it means that both estimators are valid. The choice between them is up to the user, who would weigh their respective advantages and shortcomings.

3. ASYMPTOTIC EFFICIENCY

The big advantage of ML is its asymptotic efficiency. This section assesses how far below ML the QLF efficiency falls.

This invention concentrates on a nonparametric pdf that can be represented as a linear combination of a set of square-integrable basis functions $$f(x, \theta) = \sum_\alpha \theta_\alpha^* B_\alpha(x) = \theta^\dagger B(x) (\text{Linear nonparametric } pdf) \quad (9)$$

Here $B_\alpha(x)$ are the basis functions, the coefficients $\theta_\alpha^*$; are the complex conjugates of the unknown parameters $\theta_\alpha$ characterizing the pdf, and the second part of the equation uses compact vector-matrix notation.

The pdf must be real and nonnegative, but Eq. (9) is written to allow for complex basis functions with complex coefficients, e.g., a Fourier transform, provided that they are constrained so that the pdf remains real and nonnegative. For real basis functions, the parameters are real $$\theta_\alpha = \theta_\alpha^* (\text{Real parameters}) \quad (10)$$

The simplest case is that of a single, real, nonnegative basis function, for which the only unknown is the nonnegative parameter $\theta$ $$f(x) = \theta B(x), B(x) \geq 0 \text{ (Single real basis function)} \quad (11)$$

The complex and vector notations are omitted, because there is only one real basis function and, to be specific for now, the normalization of the basis function is set to unity $$\int dx B(x) = 1 \text{ (Unit normalization)} \quad (12)$$

The LLF estimate is $$\hat{\theta} = N \text{ (LLF)}, \quad (13)$$

where N is the observed count, while the QLF estimate is $$\hat{\theta} = \sum_i B(x_i) \Big/ \int dx B(x)^2 (QLF) \quad (14)$$

Note, first, that both the LLF and QLF estimates are unbiased. Averaging Eqs. (13) and (14) over the basis function B(x) for a given number of observations N and using the normalization in Eq. (12), yields in both cases $$E(\hat{\theta}|N) = N \text{ (LLF and QLF)} \quad (15)$$

If the number of observations is a random Poisson variable with mean $\lambda$, then the expectation value is unbiased $$E(\hat{\theta}) = \lambda \text{ (LLF and QLF)} \quad (16)$$

Turning next to the variances, the variance of the LLF estimate is simply the Poisson variance:

$$V(\hat{\theta}) = \lambda \text{ (LLF)} \quad (17)$$

For the QLF, it is necessary to square the terms under the sum in Eq. (14), average over B(x), and then average over N. The resulting variance is $$V(\hat{\theta}) = \lambda \int dx B(x)^3 \int dx B(x) / (\int dx B(x)^2)^2 \text{ (QLF)} \quad (18)$$

where the general normalization is reintroduced into Eq. (18), so the equation is correct for any normalization, not just the unit integral of Eq. (12). The efficiency of the QLF estimator is then $$e = (\int dx B(x)^2)^2 / \int dx B(x)^3 \int dx B(x) \text{ (QLF efficiency)} \quad (19)$$

Note also from Eq. (19) that the efficiency is invariant under translations and scaling.

Applying the dot-product inequality (Cauchy 1821; Schwarz 1888), it follows from Eq. (19) that the QLF efficiency is bounded from above by unity, as it should be, and reaches this bound if and only if B(x) is constant over its nonzero domain. It is also seen that the efficiency can fall all the way to zero if B is not cube-integrable (example below). The interesting question is how far below unity the efficiency drops for basis functions of practical interest. Consider, therefore, next commonly used basis functions. (For the sake of brevity, the discussion is confined to one dimension, but the computation is readily extended to higher dimensionality.)

For a power-law basis function $$B(x) \propto \begin{cases} x^\alpha, & 0 < x < 1, \alpha > -1/3 \\ 0, & \text{otherwise} \end{cases} \text{ (Power-law basis function)}, \quad (20)$$

Eq. (19) yields the QLF efficiency $$e = (3\alpha+1)(\alpha+1)/(2\alpha+1)^2 \text{ (Power-law QLF efficiency)} \quad (21)$$

As expected, the efficiency reaches a maximum of e=1 for the constant basis function $\alpha=0$, and falls to zero when the integral over $B(x)^3$ diverges as $\alpha \to -\frac{1}{3}$. For the more realistic linear case $\alpha=1$, the efficiency is $e=\frac{8}{9} \approx 0.89$. The same efficiency is obtained for any triangular basis function, as can be seen by breaking it up into two linear pieces. For a general linear basis function with nonzero intercept $$B(x) \propto \begin{cases} 1 + cx, & 0 < x < 1, c \ge -1 \\ 0, & \text{otherwise} \end{cases} \text{ (Linear basis function)}, \quad (22)$$

the efficiency can be shown to lie between the above limits, $0.89 \frac{8}{9} < e < 1$.

Other cases of interest include $e=\sqrt{3}/2 \approx 0.87$ for a Gaussian basis function $$B(x) \propto \exp(-x^2/2) \text{ (Gaussian basis function)}, \quad (23)$$

and $e=\frac{14}{15} \approx 0.93$ for an inverted parabola $$B(x) \propto \begin{cases} 1 - x^2, & x^2 \le 1 \\ 0, & \text{otherwise} \end{cases} \quad (24)$$

(Inverted-parabola basis function)

Finally, consider a categorical binomial case with two probabilities p, and q=1−p. Eq. (19) becomes $$e = (p^2+q^2)^2/(p^2+q^3) \text{ (Binomial QLF efficiency)}, \quad (25)$$

which is e=1 for p=1, q=0, p=0, q=1 and p=0.5, q=0.5, and drops to a minimum of $e=\frac{8}{9} \approx 0.89$ in between.

It can therefore be concluded that, for practical basis functions, the loss of asymptotic efficiency of the QLF is in the range of 10-15%, which is tolerable, given the advantages of the QLF, as detailed below. It should be noted, however, that the efficiency of neither the LLF nor the QLF is known in the non-asymptotic regime.

4. LINEAR NONPARAMETRIC PDF

The advantage of the QLF is seen immediately by considering a linear nonparametric pdf, which is a combination of multiple, square-integrable basis functions, Eq. (9). Setting the gradients of the respective estimators Eqs. (1) and (4) with respect to $\theta_\alpha^*$ to zero yields $$\nabla_\alpha L = 2 - 2\sum_i \frac{B_\alpha(x_i)}{\sum_\beta \theta_\beta^* B_\beta(x_i)} = 0 \quad (LLF \text{ gradient) and} \quad (26)$$

$$\nabla_\alpha L = \sum_\beta \theta_\beta \int dx B_\alpha(x) B_\beta(x)^* - \sum_i B_\alpha(x_i) = 0 \quad (27)$$

(QLF gradient)

The LLF gradient equation is seen to be very nonlinear in the parameters, except for the case of a single basis function discussed in § 3, but the QLF gradient is linear.

Expressing the QLF and its gradient in compact vector-matrix notation yields $$L = \frac{1}{2}\theta^\dagger Q\theta - \theta^\dagger b \text{ (QLF)} \quad (28)$$

$$\nabla L = Q\theta - b = 0 \text{ (QLF gradient)}, \quad (29)$$

Where Q is the Gram matrix $$Q = \int dx B(x) B(x)^\dagger \text{ (Gram matrix)}, \quad (30)$$

and b is the source term $$b = \sum_i B(x_i) \text{ (Source term)} \quad (31)$$

The optimization of the QLF in § 5 below is greatly facilitated by the fact that the Gram matrix Q is always positive semidefinite, and positive definite if the basis functions are linearly independent. Note also that the basis functions need to be square integrable, as required, so that the elements of Q are finite.

A second advantage of the QLF in Eq. (28) is that Q depends only on the system of basis functions used, Eq. (30), while all the data dependence is in the source term b, Eq. (31).

5. WEIGHTED QUADRATIC LIKELIHOOD FUNCTIONAL

A variant of the QLF presented so far is one in which the data points are weighted, and each event i is characterized by a location $x_i$ plus a known weight $w_i$. For example, the events observed may be detections of photons with known, but different energies, and the distribution function of interest is that of the energy deposited, not of the number of photons. In another example, the events may be sales at different prices, while the desired distribution function is that of the dollar sales volume, not the number of sale events. In such cases, the QLF can be modified to be $$L = \int dx \left[ \frac{1}{2} f(x)^2 - f(x) \sum_i w_i \delta(x - x_i) \right] \text{ (weighted } QLF\text{)}. \quad (32)$$

The fully unconstrained pdf and piecewise-constant pdf solutions of Eq. (32) mirror Eqs. (7) and (8)

$$\hat{f}(x) = \sum_i w_i \delta(x - x_i) \quad (33)$$

(fully unconstrained weighted pdf), $$\hat{f}_K = \sum_{i \in K} w_i / V_K \quad (34)$$

(piecewise-constant weighted pdf), and similarly demonstrate the consistency of the estimated pdf.

The analysis of the linear combination of basis functions in § 3 continues as before. The Gram matrix Q is unaltered, and the source term becomes $$b = \sum_i w_i B(x_i) \quad \text{(weighted source term).} \quad (35)$$

In particular, Q again depends only on the system of basis functions used, while all the data dependence, including the weights, is in the source term b.

In the following discussion it is assumed that b is given by Eq. (35), with the special, unweighted case being $$w_i = 1 \quad \text{(special unweighted case).} \quad (36)$$

6. NONUNIFORMITY CORRECTION

A minor complication occurs when the detection probability is not uniform across the detector, possibly varying rapidly from one pixel to the next or including "dead pixels".

The standard way to deal with this problem is to measure the counts U(x) for an intense constant source. (By convention, U(x) is usually normalized to a mean or a median of unity.) The simplest way to include this calibration in the context of the present invention is to replace the basis functions by new ones given by $$\tilde{B}(x) = U(x)B(x) \quad \text{(uniformity correction).} \quad (37)$$

The analysis then continues as before.

7. BACKGROUND

The "background" is the part of the pdf that varies slowly over x, while the "signal" can vary more rapidly. The background is often due to a different process, so there is justification in maintaining the distinction between signal and background in the estimated model.

In some applications, the background can be characterized by a few basis functions with unknown parameters, e.g., a constant and maybe also terms that vary slowly with x. The background basis functions are then included in the estimation process, and in the end they are simply labeled as background and reported separately.

In other applications, the background may be known or estimated from other data, and should be added to the pdf as a separate, known term A(x), which is not part of the estimated parameters. The combined pdf for signal and background is then $$\tilde{f}(x) = f(x) + A(x) \quad \text{(pdf with background).} \quad (38)$$

When the signal is described as a linear combination of basis functions, Eq. (9), the pdf becomes $$\tilde{f}(x) = \theta^\dagger B(x) + A(x) \quad \text{(pdf with background)} \quad (39)$$

Dropping a constant term, the estimator is then $$L = \tfrac{1}{2}\theta^\dagger Q\theta - \theta^\dagger b + \theta^\dagger a = \tfrac{1}{2}\theta^\dagger Q\theta - \theta^\dagger \tilde{b} \quad \text{(QLF with background),} \quad (40)$$

where $$a = \int dx B(x) A(x) \quad \text{(Background in solution space)} \quad (41)$$

and $$\tilde{b} = b - a \quad \text{(Background-subtracted source term).} \quad (42)$$

The result of introducing a fixed external background, then, is simply to subtract the background term a from the source term b in solution space. Note, however, that a is given by an integral over all x, Eq. (41), while b is a sum over the observations $x_i$, Eq. (31).

8. OPTIMIZATION

The optimization of the general QLF in Eq. (4) depends on how the pdf is parameterized. For the linear nonparametric pdf of primary interest, the QLF is a convex quadratic form, Eq. (28), with Q and b given by Eqs. (30) and (31). The gradient equation to solve, Eq. (29) is then a linear equation in θ. In almost all cases, however, the linear equation must be solved iteratively, as illustrated in the basic flow chart 200 provided in FIG. 2. This flow chart follows conventional iterative processes as are known in the art and is, therefore, labeled "prior art."

Briefly, as shown in flow chart 200, a conventional iterative process begins with input 201, which provides the initial parameters 202 and data 203 to be modeled. Using the initial parameters 201, a data model 207 is constructed. The fit of the data model 207 to the data 203 is computed by the parameter estimator in step 204 and then evaluated for goodness of fit in step 205. If the fit falls within a predetermined range or threshold, the estimated parameters may be displayed (step 208) and/or stored in memory (step 209). If the specified fit conditions are not achieved, the process repeats by updating the parameters in step 206, constructing a modified data model based on the updated parameters and evaluating fit until the desired conditions are met.

Figure 2:
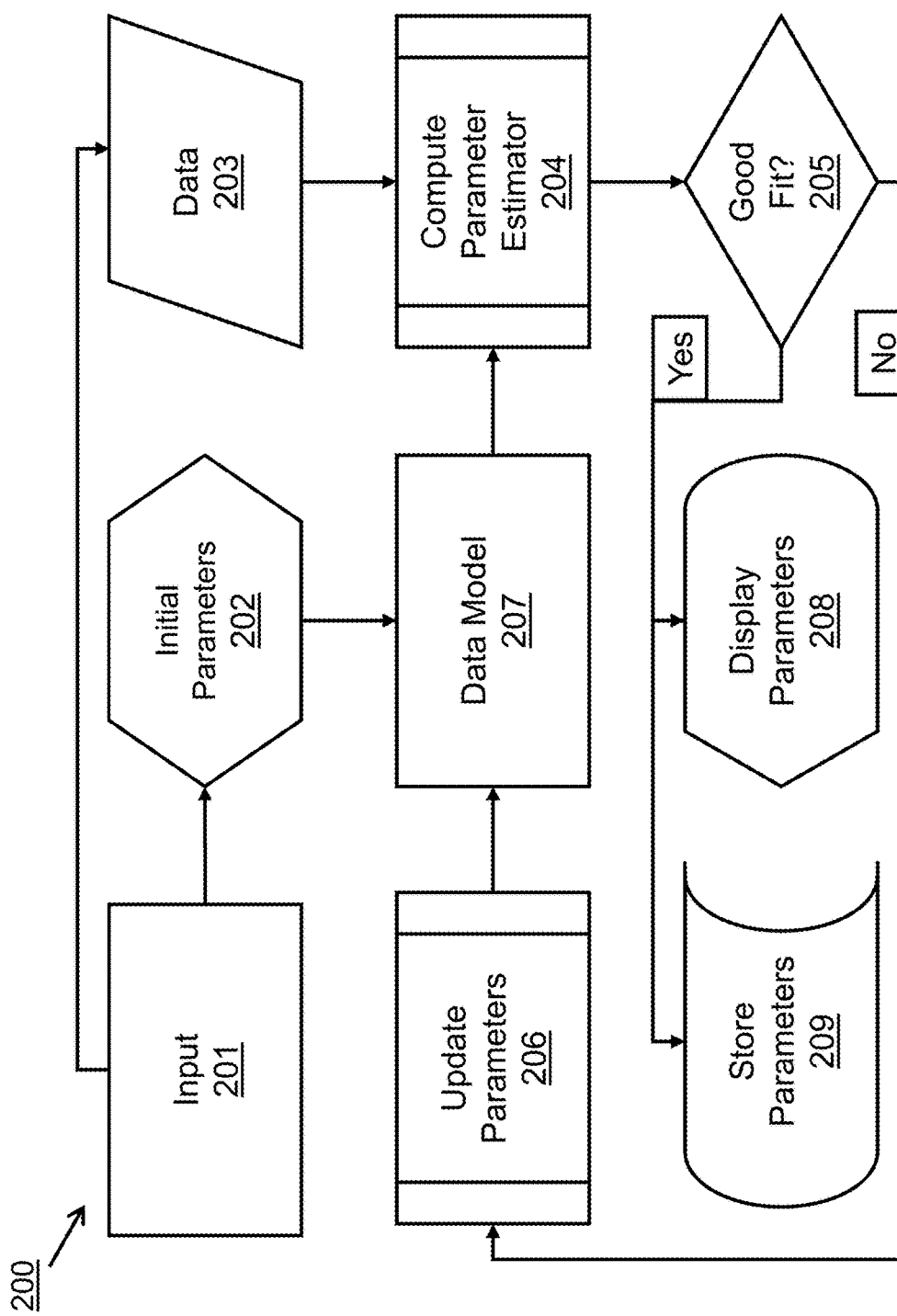
FIG. 2 is a schematic flow chart of a conventional iterative parameter estimation process.

Iterative schemes of the basic type shown in FIG. 2 are usually effective in estimating parameters but they can also have serious difficulties, including:

1. Large-scale problems may contain millions of data points and millions of parameters. It is then not practical to store B, $B^\dagger$ and Q in memory as full matrices with trillions of elements. Sparse matrix representation is usually possible, but for many systems even the sparse matrices are too large. In those cases, B, $B^\dagger$ and Q must be treated as operators, with each matrix multiplication computed afresh using massive parallelization.
2. As a corollary, it is not possible to employ any method that requires serious rearrangement of B, $B^\dagger$, Q, or any related matrix. In particular, it is out of the question to compute the inverse Gram matrix $Q^{-1}$, or even a Cholesky decomposition of Q (e.g., Press et al. 2007).
3. For many problems, Q is ill conditioned, i.e., the ratio between its largest and smallest eigenvalues in absolute value is very large. This means that, unless controlled, the statistical noise in the source term b can be greatly magnified in the optimization, leading to significant artifacts in the solution. The optimization method must therefore have a good constraining mechanism.

The above considerations suggest using the iterative conjugate-gradient (CG) method (Fox, Huskey & Wilkinson 1948; Hestenes & Stiefel 1952). The CG has the advantage that it does not require any matrix to be computed explicitly, and the matrices B, $B^\dagger$ and Q can be applied as operators.

The Qθ term in the QLF gradient, Eq. (29), is broken up into two steps, a forward projection $B^\dagger\theta$ from parameter space to data space, followed by a back projection B from data space back to parameter space.

Non-asymptotic problems, in which the number of estimated parameters is comparable to or exceeds the number of data points, require additional constraints to avoid noise being fitted as signal, resulting in artifacts in the solution. Constraining methods (e.g., the review by Puetter et al 2005) can be applied to the QLF estimator in much the same way as they are applied to other statistical estimators, although they may require additional statistical estimators.

Most PIXON® method applications, for example, determine the degree of smoothing using a goodness-of-fit (GOF) statistic, which may be different from the parameter estimator. An exception is a new technique, which applies PIXON® smoothing to the gradient of the parameter estimator and does not require an additional GOF statistic (U.S. Pat. No. 8,675,983).

The CG method also lends itself to the application of constraints by the method of projections onto convex sets (Biemond, Lagendijk & Mersereau 1990). For example, the parameters must often be nonnegative $$\theta \geq 0 \text{ (Nonnegativity condition)} \tag{43}$$

This condition can be imposed after each iteration by simply truncating negative components to zero (Puetter et al. 2005) and continuing as though no truncation took place.

9. PRECONDITIONER

The CG method can be greatly accelerated by adding a preconditioner (e.g., Golub & Van Loan 1996; Saad 2003), replacing the gradient of the QLF with $$G = P^{-1}\nabla L = P^{-1}(Q\theta - b) \text{ (Gradient with preconditioner)}, \tag{44}$$

where the linear equation $$P\theta = c \text{ (Preconditioning equation)} \tag{45}$$

can be solved with ease. The resulting method is known as the preconditioned conjugate-gradient (PCG) method.

A clever, problem-dependent preconditioner can significantly speed up the convergence rate of the PCG method. A failsafe general choice is simple rescaling, in which P is set to the diagonal part of Q, i.e. a diagonal matrix whose elements are given by $$P_{\alpha\alpha} = Q_{\alpha\alpha} = \int dx |B_\alpha(x)|^2 \text{ (Scaling preconditioner)} \tag{46}$$

The scaling preconditioner works due to the diagonal predominance of the semidefinite Q $$|Q_{\alpha\beta}| \leq \sqrt{Q_{\alpha\alpha}Q_{\beta\beta}} \text{ (Diagonal predominance)} \tag{47}$$

The degree to which preconditioning accelerates convergence depends on how far the off-diagonal terms of Q are from the limit in Eq. (47) and the condition number of Q.

Eq. (46) may be difficult to compute in practice for large-scale problems, however, because it needs to be evaluated separately for each basis function, which involves applying $B_\alpha^*$ followed by $B_\alpha$ as operators. An alternative (Ahn & Fessler 2003) is to replace Eq. (46) by $$P_{\alpha\alpha} = \int dx B_\alpha(x) \sum_\beta B_\beta(x)^* \text{ (Alternative preconditioner)} \tag{48}$$

The computational advantage is that the sum in Eq. (48) can be computed as a single forward projection on an array of unit parameters $$\sum_\beta B_\beta(x)^* = B^\dagger 1 \text{ (Single forward projection)} \tag{49}$$

10. NONLINEAR CASE

The simplicity of the linear nonparametric representation of the solution in Eq. (9) cannot be overstated. Nevertheless, it is occasionally useful to introduce additional, nonlinear parameters to characterize the basis functions. An example might be basis functions whose widths are adjustable. It is then necessary to add the partial derivatives of the QLF with respect to the nonlinear parameters and to pursue a nonlinear CG optimization (e.g., Press et al. 2007).

11. NUMERICAL INTEGRATION

It was noted in preceding § 10 that the Gram matrix Q depends only on the system, and all the data dependence is in the source term b. The practical manifestation of this difference is that Q is a spatial integral over data space, Eq. (30), while b is a sum over the data points, Eq. (31).

Spatial integration over fixed meshes quickly becomes computationally intensive as the dimension of the problem increases, because spatial resolution requires a commensurate number of mesh points in each dimension ("the curse of dimensions"). There are two ways to address this difficulty. One method is to form an adaptive hierarchical Cartesian mesh in data space. An alternative is to recognize that a "natural" structureless mesh is provided by the positions of the data points themselves. One can divide data space by a Voronoi (1908) tessellation of the data positions, in which the (usually finite) data volume V is divided into cells, with each point in space assigned to the cell around its nearest data position $$V_i = \{x \in V | |x - x_i| < |x - x_k|, \forall k \neq i\}, i = 1, \ldots, N \text{ (Voronoi cell)} \tag{50}$$

See Press et al. (2007) for a discussion of Voronoi tessellation. The restriction of the Voronoi cells to the volume V is achieved by truncating the unbounded Voronoi cells.

Once data space is tessellated, it is only necessary to compute the pdf at the positions of the data points. The spatial integral over a function F (x) is approximated by a sum over the products of the values of the integrands at each data point and the volumes of their Voronoi cells $$\int dx F(x) \approx \sum_i F(x_i) V_i \text{ (Voronoi integral)} \tag{51}$$

($V_i$ is loosely used to designate both the set of points comprising Voronoi cell i and its volume.)

The Voronoi cells admittedly have fluctuating volumes due to the statistical fluctuations in the positions of the data points, but the integrated functions should be smooth over a number of data points, so the extra variance caused by the variation in Voronoi volumes should not seriously affect the computed integral.

Another possibility is to construct a centroidal Voronoi tessellation (CVT), in which the nodes of the tessellations are also their centroids (Du, Faber & Gunzburger 1999). The pdf is then computed at the nodes of the CVT and integrated with the smoother cell volumes. The pdf values at the positions of the data points, required for the source term b, can be computed by interpolation. The determination of the CVT requires some computational effort, but there is a parallelized probabilistic method to do so (Ju, Du & Gunzburger 2002) and a more recent Newton-type optimization of a CVT energy function, taking advantage of its $C^2$ smoothness (Liu et al 2009).

Figure 3:
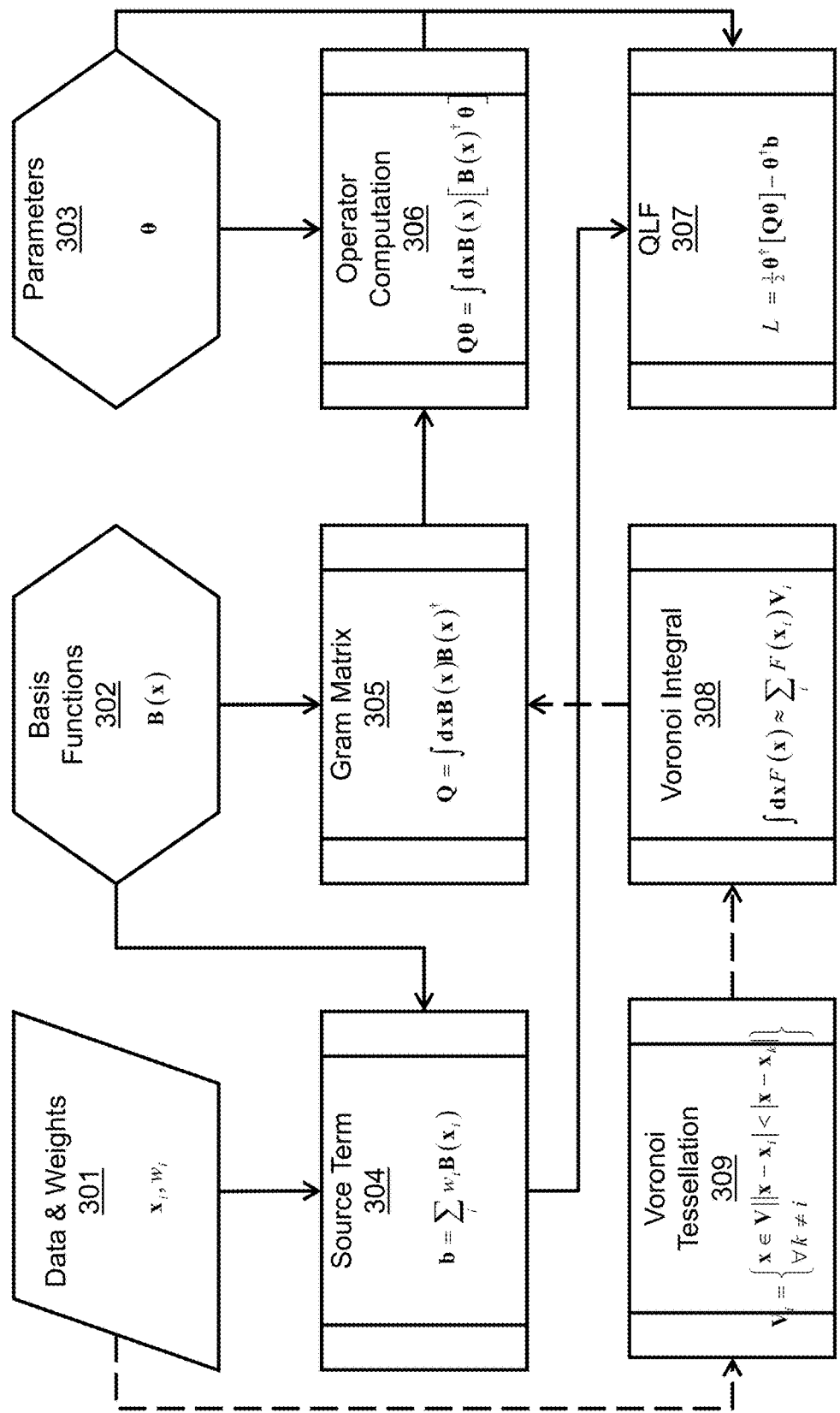
FIG. 3 is a schematic flow chart of an iterative parameter estimation process according to the present invention.

At the center of all of the applications presented herein is the computation of the QLF in iterative parameter estimation, the basic steps of which are shown in FIG. 2. The essence of this computation, as described in §§ 4-11, is shown in the flow chart of FIG. 3. The data & weights 301 and basis functions 302 are used to compute the source term 304 and the Gram matrix 305, which is then combined with the parameters 303 to give the QLF 307. The Gram matrix 307 is usually not computed explicitly, particularly for large-scale problems, but the basis functions 302 and their conjugates are applied as operators in step 306. An additional option is to approximate integrals over data space by Voronoi integrals 308, based on a Voronoi tessellation 309 of the data as detailed in § 11. This optional step is indicated in the flowchart by dashed lines connections. Some of the other optional features detailed in §§ 4-11 are omitted for clarity, but should be evident to anyone versed in the art.

Figure 4A:
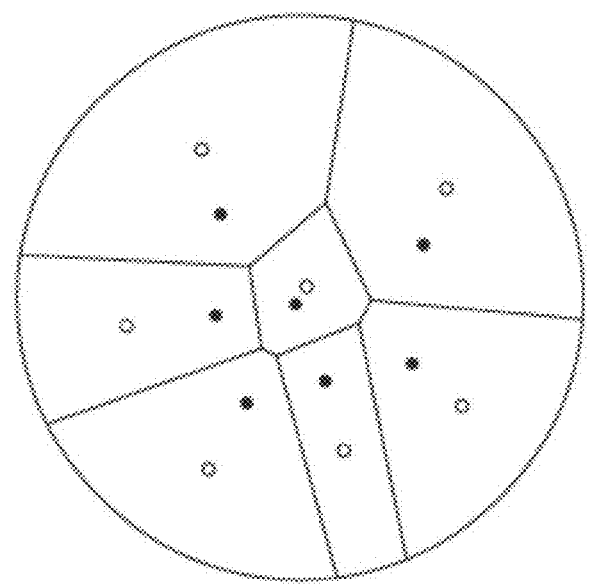
FIGS. 4a and 4b illustrate, respectively, an ordinary Voronoi tessellation of a circular domain with 7 sites marked with black dots and the centroids of the Voronoi cells marked with small circles, and a CVT of the same domain with 7 sites.
Figure 4B:
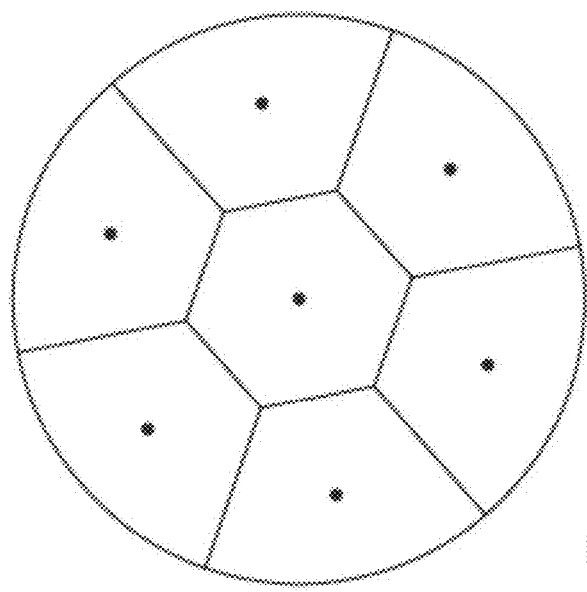

FIGS. 4*a* and 4*b* compare an ordinary Voronoi tessellation with a CVT, where FIG. 4*a* shows an ordinary Voronoi tessellation of a circular domain with seven sites marked with black dots and the centroids of the Voronoi cells marked with small (open) circles, and FIG. 4*b* shows a CVT of the same domain with seven sites.

12. EXAMPLES

The following provide examples of applications of the inventive algorithm for statistical estimation:

Example i: Sparse Signal Detection

Figure 6:
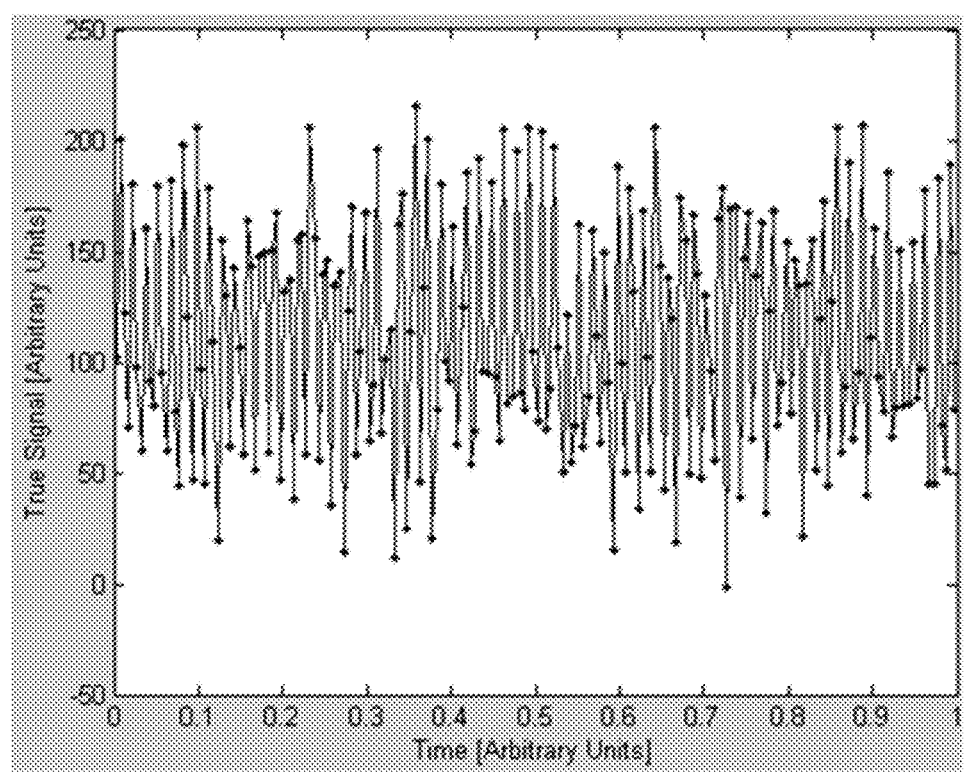
FIG. 6 shows a simulated signal composed of a strong periodic component, some white noise, and a constant background.
Figure 7:
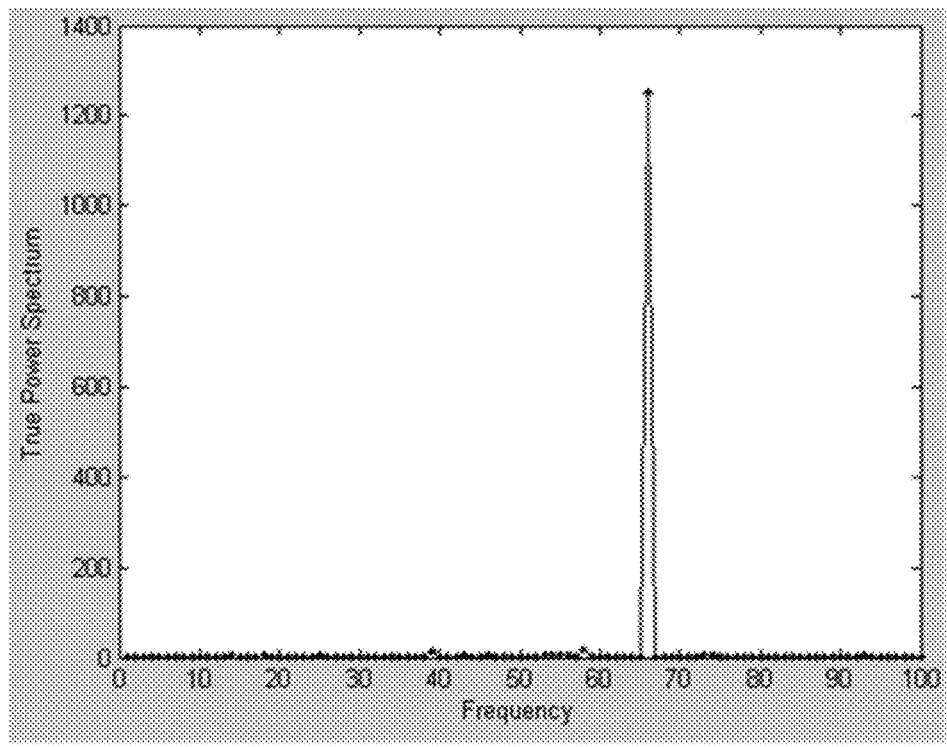
FIG. 7 shows the power spectrum of the signal in FIG. 6 (zero frequency omitted), showing a single peak and some white noise.

Even a strong signal may be difficult to detect if sampled too sparsely. For example, a military signal may be observed from a large distance, with only a small number of photons being detected. FIG. 6 provides a simulation of a source emitting a strong periodic signal, plus some white noise, above a nonzero constant background. FIG. 7 displays the power spectrum (Press et al 2007) of the signal in FIG. 7, showing the relative intensities of the different frequencies (zero frequency omitted).

Figure 8:
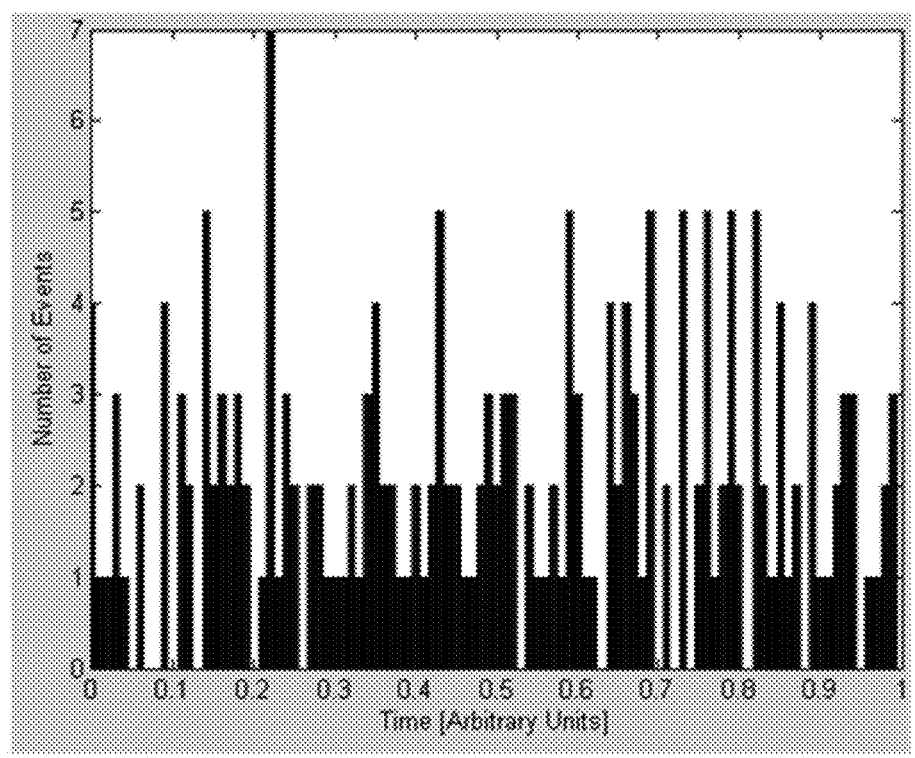
FIG. 8 is a histogram of 200 photons from the source in FIG. 6, "detected at a large distance".
Figure 9:
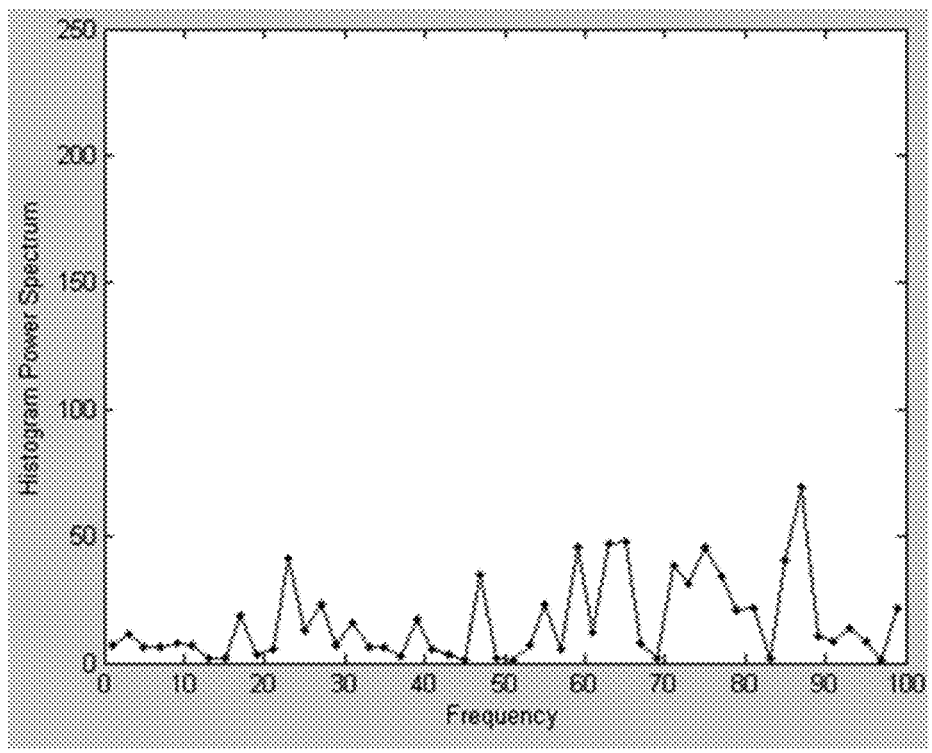
FIG. 9 is a plot of the power spectrum with frequency of the histogram of 200 photons in FIG. 8 (zero frequency omitted), showing no periodicity.
Figure 10:
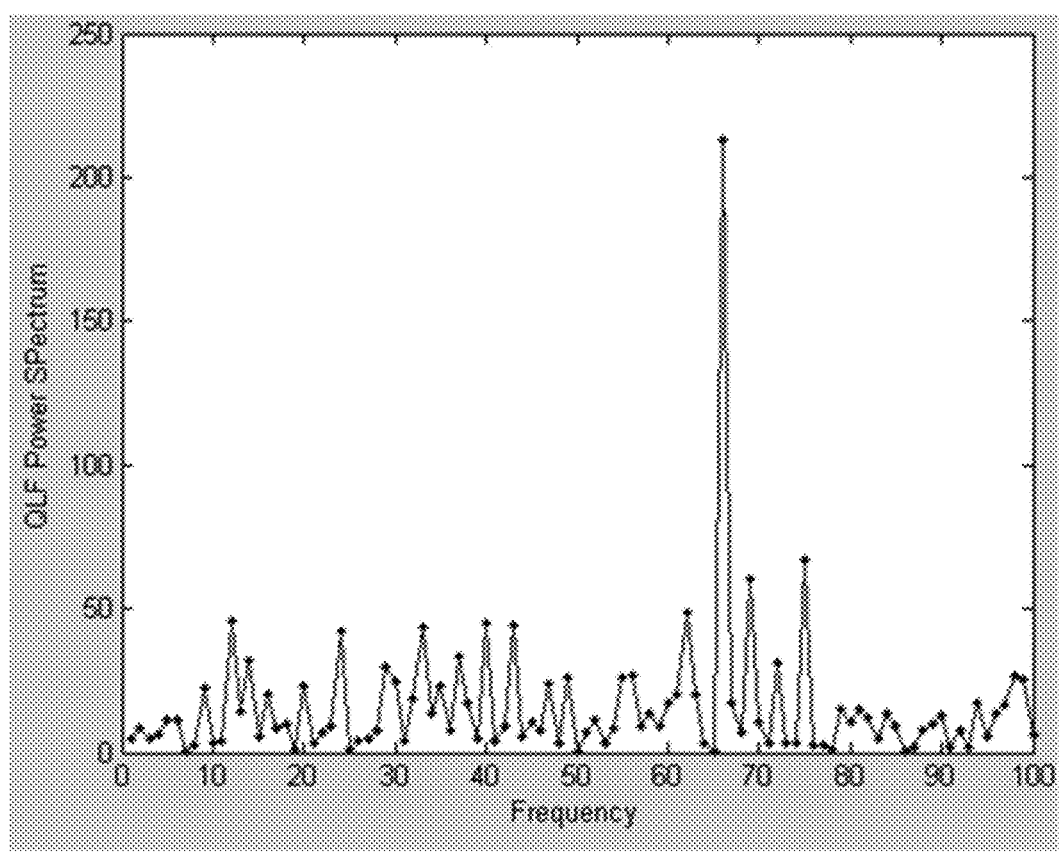
FIG. 10 is a plot of the power spectrum with frequency determined by QLF parameterization of the 200 detected photons (zero frequency omitted), showing a clear periodicity at the correct frequency.

Because the detector is "very far from the source", a relatively small number of photons, e.g., 200 photons, are detected. A histogram of the arrival times of the photons in FIG. 8 shows some high-frequency behavior, but no periodicity is detected in the power spectrum of the histogram in FIG. 9. QLF estimation, on the other hand, clearly detects the periodic signal in the power spectrum at the correct frequency, as seen in FIG. 10.

Example ii: Digital Mammography

Digital mammography uses essentially the same X-ray mammography system as conventional mammography, but the system is equipped with a digital receptor and a computer instead of a film cassette. In standard mammography, images are recorded on film using an x-ray cassette, and the film is viewed by the radiologist using a light box and then stored in a jacket in the facility's archives. With digital mammography, the breast image is captured using a special electronic X-ray detector, which converts the image into a digital picture for review on a computer monitor and storage on a digital archival system. With digital mammography, the magnification, orientation, brightness, and contrast of the image may be altered to help the radiologist see certain areas more clearly.

Digital full-field mammography allows screening for and diagnosing breast cancer and may eventually replace traditional mammography. Digital spot-view mammography allows faster and more accurate stereotactic biopsy, in which the breast is imaged from two different directions, thereby providing more accurate, 3D guidance of the biopsy. This results in shorter examination times and significantly improved patient comfort and convenience, because the time the patient must remain still is much shorter. With digital spot-view mammography, images are acquired digitally and displayed immediately on the system monitor, while traditional stereotactic biopsy requires that a mammogram film be exposed, developed and then reviewed, greatly increasing the time before the breast biopsy can be completed.

Digital mammography has the potential to provide many benefits over standard film mammography: (a) improved contrast between dense and non-dense breast tissue, (b) faster image acquisition (less than a minute), (c) shorter exam time (approximately half that of film-based mammography), (d) easier image storage, (e) physician manipulation of images for more accurate detection of breast cancer, (f) ability to correct under/over-exposure of films without having to repeat mammograms, and (g) digital transmittal of images for remote consultation with other physicians.

QLF, in conjunction with noise-reducing technology, such as the PIXON® method, could assist in these targets by making better use of the collected digital data to improve the acuity of mammography images. This would enable the physician to obtain the same image quality with lower X-ray counts, allowing for lower doses, a shorter scan time, or a combination of the two.

Figure 11:
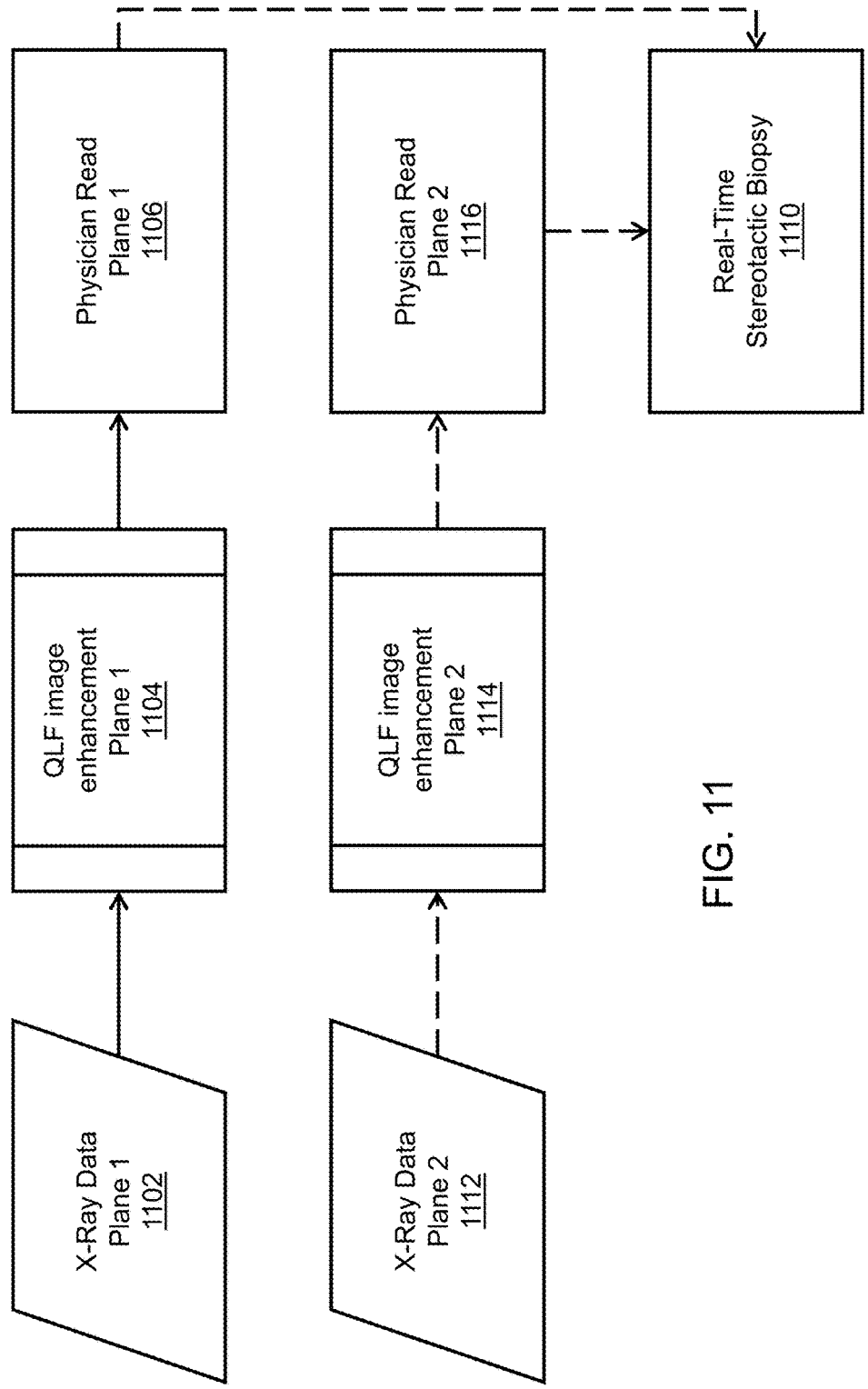
FIG. 11 is a flow chart showing an exemplary application of the inventive QLF method for modeling of X-ray data to assist in the performance of real-time stereotactic biopsy.

Specifically, QLF, with its linear gradients, would provide much faster noise-reducing processing than the Poisson LLF, whose gradients are nonlinear. This is particularly important in stereotactic biopsies, in which the physician must see the images in real time to be able to guide the biopsy needle. FIG. 11 provides an exemplary flowchart for enhancing a single plane mammogram in step 1102 using QLF (step 1104), the results of which are displayed to the physician in step 1106. Optional stereotactic biopsy may be performed using the guidance of a second plane mammogram (step 1112), which is enhanced using QLF (step 1114) and displayed to the physician in step 1116 to provide real-time guidance for biopsy. Centroidal Voronoi tessellation offers additional noise reduction in areas of particularly low counts.

In addition, better images can be used to develop machine learning tools that automatically guide the physician to areas of potential abnormality. Such tools must be thoroughly tested to insure that they do not overlook areas of abnormality (false negative) but, once proven, can significantly improve the efficacy of reading the exam, and reduce the time required to complete the reading, and increase the physician confidence in the diagnosis.

QLF could assist in this process not only in generating better images but also by providing a reliable numerical representation of the image in the form of the amplitudes of the basis functions. Experience has shown that these amplitudes, known as a spectral representation, are often more useful input data for machine learning tools than the original pixel image intensities (a better machine-learning language).

Example iii: Angiography

Angiography is a medical imaging technique used to visualize the inside of blood vessels and organs of the body, with particular interest in the arteries, veins and the heart chambers. This is traditionally done by injecting a radio-opaque contrast agent into the blood vessel and imaging using X-ray detectors. Depending on the type of angiogram, access to the blood vessels is gained most commonly through the femoral artery, to look at the left side of the heart and at the arterial system; or the jugular or femoral vein, to look at the right side of the heart and at the venous system. Using a system of guide wires and catheters, a type of contrast agent (which shows up by absorbing the X-rays), is added to the blood to make it visible on the x-ray images. Angiographic systems in use today generally provide images from two different views to allow for better 3D positioning, as in sterotactic biopsies.

The X-ray images taken may either be still images or motion images. For all structures except the heart, the images are usually taken using a technique called digital subtraction angiography (DSA). Images in this case are usually taken at 2-3 frames per second, which allows the interventional radiologist to evaluate the flow of the blood through a vessel or vessels. DSA subtracts the bones and other organs so only the vessels filled with contrast agent can be seen. The heart images are taken at 15-30 frames per second, not using DSA, because the subtraction technique requires the patient to remain motionless and cannot be used on the pulsating and moving heart. Both these techniques enable the interventional radiologist or cardiologist to see blocking or narrowing inside the vessel (stenosis), which may be inhibiting the flow of blood and causing pain.

Traditional angiographic X-ray detectors use fluoroscopy, a process in which the X-ray photons are absorbed using a fluorescent medium and their energies reemitted as optical photons by an image intensifier and detected by a charge-coupled device (CCD) video camera, which allows the images to be recorded and played on a monitor. This is not strictly a photon-counting device, because each X-ray photon results in a large and variable number of optical photons. It also results in large radiation doses, which not only affect the patient but also limit the amount of time that the clinicians can practice. (While they wear protective gear, it does not provide complete protection, hence the need to limit weekly and lifetime practice.) In order to reduce this dose, an effort is now underway to build solid-state X-ray detectors that detect the X-rays directly as a photon-counting device. QLF could be a particularly effective tool in the upcoming photon-counting devices to improve image quality and reduce dose.

Figure 12:
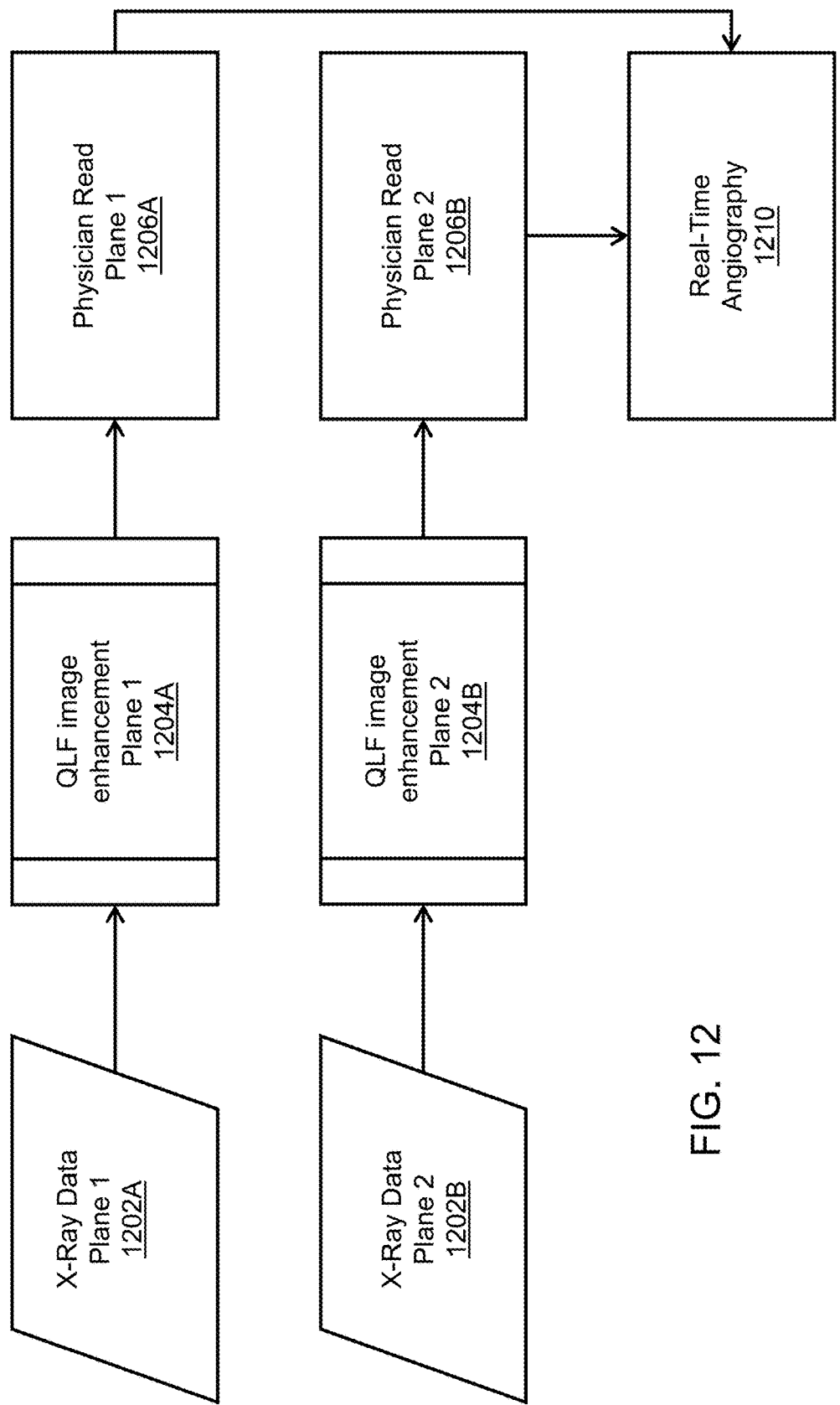
FIG. 12 is a flow chart showing an exemplary application of the inventive QLF method for modeling of X-ray data for real-time imaging during an angiography procedure.

Again, QLF, in conjunction with noise-reducing technology, could be a particularly effective tool in the upcoming photon-counting devices to improve image quality and reduce dose. Processing would be similar to the one outlined for mammography, except that there are generally two imaging planes and processing must be done in real time, at the same time the physician is guiding the wire through the blood vessels. Referring to FIG. 12, X-ray data is collected in two planes in steps 1202A and 1202B. Each plane is separately processed using QLF enhancement in steps 1204A and 1204B. The processed images are displayed to the physician in steps 1206A and 1206B, providing precise guidance to the physician who is performing the angiography procedure. The potential for reduced radiation dose is particularly important in this application, because the clinicians are in close proximity to the patients and exposed to significant radiation in spite of the protective gear that they wear. Significant dose reduction can therefore allow the clinicians increased contact time, thereby changing the way in which this field of medicine is practiced.

Example iv: Computed Tomography

Computed tomography (CT) provides a diagnostic and measuring method for medicine and test engineering through which internal structures of a patient or a test object can be examined without requiring invasive surgical procedures on the patient or damage to the test object. In this case, there are recorded from various angles a number of projections of the object to be examined from which it is possible to calculate a 3D image of the object.

Tomographic images are produced by converting observed projections (data) into 3D images. For example, in X-ray CT imaging, X-ray beams are directed at an object and the beams are attenuated by various amounts due to varying structures within the object. On the other side of the object, the attenuated beams are measured with detectors. Such projections are produced at many different angles around the object. The projections are then used to compute 3D images in a process known as tomographic image reconstruction.

Initially, and to a large extent still today, CT image reconstruction has been performed by a simple transformation known as filtered back projection. However, the projection measurements are noisy, and the relative noise level depends upon the amount of attenuation. Projections through dense materials, such as bone and especially metal, have lower signal-to-noise ratios than projections through flesh, water, or other less dense materials. Coping with the large and spatially varying fluctuations in the number of detected photons has therefore led to the development of statistical image reconstruction techniques to improve the image.

Proper statistical modeling can lead to lower noise images, thereby enabling reductions in X-ray dose to the patient. The problem is posed as finding the images that best fit the measurements according to the (possibly nonlinear) physical model and a statistical noise model. The reconstruction can be iterative, requiring a number of passes. QLF can play a particularly important role in statistical image reconstruction, especially with devices, now under development, which detect individual photons. In its ultimate form, the data are arranged in a list of detected photons. Each photon is recorded individually with its energy and time and position of its detection. This is the granular quantum limit of detection, for which QLF is ideally suited, because it is designed to handle individual events.

Figure 13:
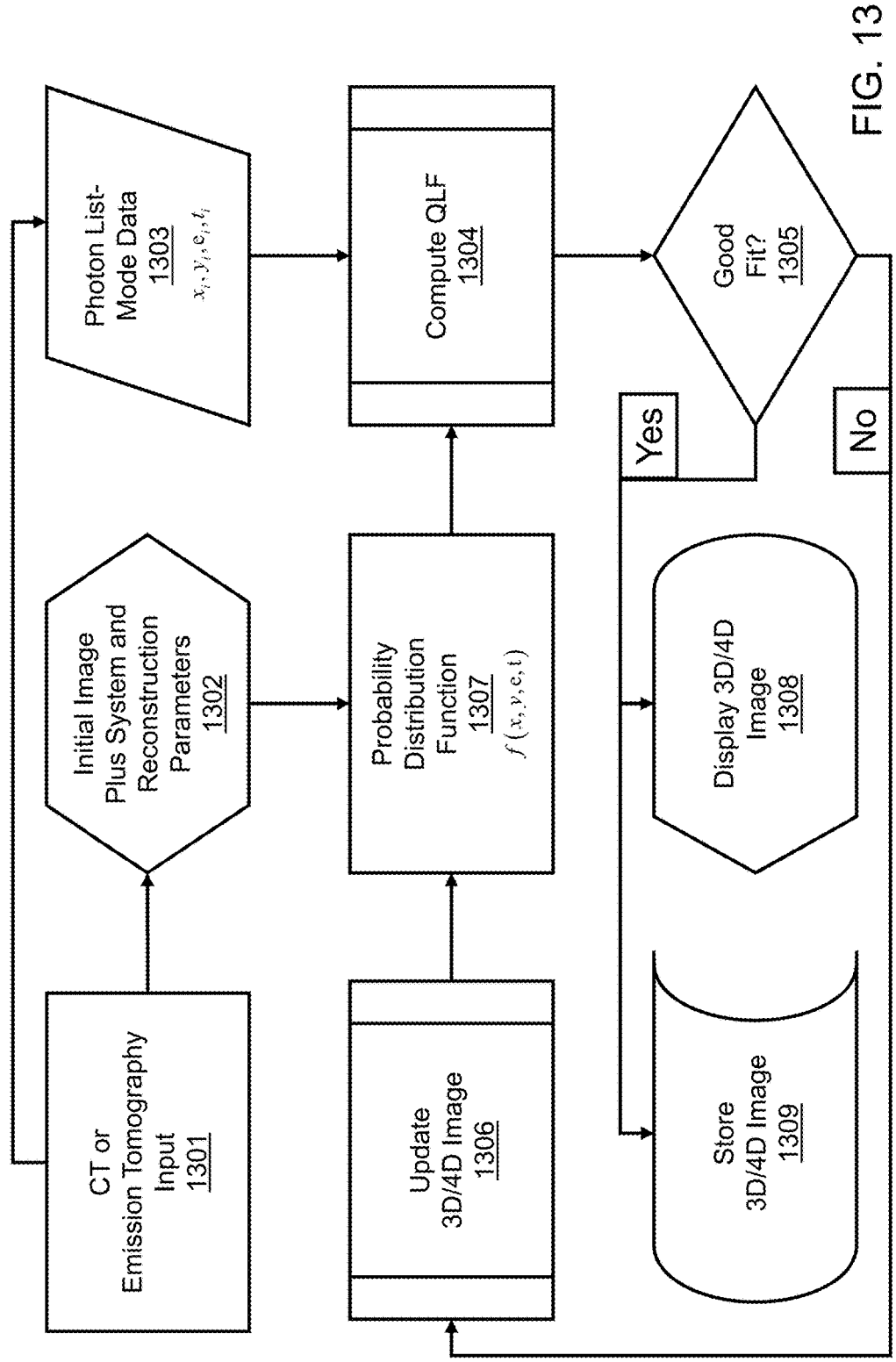
FIG. 13 is a flow chart showing an exemplary application of the inventive QLF method for modeling of CT or emission tomography data to generate 3D or 4D images of an area of interest.

FIG. 13 provides a flow chart illustrating the steps for enhancement of computed tomography or emission tomography data for use in generation of 3D or 4D models to assist in, for example, non-invasive volume or functional evaluation of the heart, brain, or other internal organ or body structure. The process flow generally follows that shown in FIG. 2. The data (digitized CT or ET image data 1301) and initial image plus system and construction parameters 1302 are used to compute the initial pdf 1307. The pdf 1307 operates on the photon list mode data 1303 (energy, time and position of each photon) to compute the QLF 1304. The fit of the QLF estimation to the data 1301, 1303 is evaluated for goodness of fit in step 1305. If the fit falls within a predetermined range or threshold, the estimated parameters are used to generate a multi-dimensional image according a may be displayed (step 1308) and/or stored in memory (step 1309). If the specified fit conditions are not achieved, the process repeats by updating the image parameters in step 1306, recalculating the pdf in step 1307 modified data model based on the updated parameters and evaluating fit (1305) until the desired conditions are met and the results can be displayed (1308) and/or stored in memory (1309).

The availability of time information has the potential of enabling 4D CT imaging, with time as the fourth dimension. This would allow CT to measure dynamic processes in which the image changes with time, e.g., a pulsating and moving heart. The limiting factor is the number of photons in each short time interval, and QLF can assist by unbinned reconstruction of the list-mode data.

Example v: Emission Tomography

Emission tomography is a nuclear medicine imaging technique that produces a 3D image of functional processes in the body using tomographic techniques similar to those used in CT. The difference is that a gamma-emitting or positron-emitting radioisotope (called radionuclide) is injected into the bloodstream of the patient. Gamma-emitting radionuclides emit a single photon, and the imaging method is known as single-photon emission computed tomography (SPECT, or sometimes SPET). By contrast, emitted positrons annihilate with electrons in the body to form two photons moving in opposite directions, which are detected in coincidence; the imaging method is known as positron emission tomography (PET).

Most of the time, the marker radioisotope, which is of interest only for its radioactive properties, is attached to a specific ligand to create a radioligand, which is of interest for its chemical binding properties to certain types of tissues. This marriage allows the combination of ligand and radio-isotope (the radiopharmaceutical) to be carried and bound to a place of interest in the body, which then (due to the direct or indirect gamma-emission of the isotope) allows the ligand concentration to be imaged.

Nuclear scans are increasingly read alongside CT or magnetic resonance imaging (MRI) scans, with the combination giving both anatomic and metabolic information (i.e., what the structure is, and what it is doing biochemically). Because nuclear imaging is most useful in combination with anatomical imaging, modern nuclear scanners are now available with integrated high-end multi-detector-row CT scanners or, more recently, MRI. Because the two scans can be performed in immediate sequence, or even simultaneously, during the same session, with the patient not changing position between the two types of scans, the two sets of images are more precisely registered, so that areas of abnormality on the nuclear images can be more perfectly correlated with anatomy on the CT or MRI images. This is very useful in showing detailed views of moving organs or structures with higher anatomical variation, which is more common outside the brain. More recently, the anatomical modality, which has better resolution than nuclear imaging, has been used to guide the nuclear image reconstruction itself. (Previously, the role of CT images was confined to providing nuclear attenuation maps, in addition to the anatomical correlation described above.)

A technique much like the reconstruction of computed tomography (CT) is commonly used to produce the 3D image, although the data set collected in nuclear imaging has far fewer photons than CT, so reconstruction techniques are more difficult. QLF processing can then be used to improve image quality and/or reduce the dose injected into the patient. The physical setup of emission-tomography devices is very different from CT, but this only affects the forward and back projection operators (see § 8) and not the basic reconstruction methodology, which can actually be quite similar for CT and emission tomography. The flowchart in FIG. 13 is therefore equally applicable to emission tomography, albeit with different system setup and parameters.

Based on the foregoing detailed description and examples, other applications of the inventive QLF method for statistical modeling of data will be readily apparent to those of skill in the art. Accordingly, the scope of the invention is not intended to be limited solely to the specific examples described herein.

The following list of references helps define the background and general state of the art in statistical image reconstruction. The listed references demonstrate the level of skill in the art and are incorporated herein as part of the disclosure to the extent that may be necessary for a person of skill in the art to fully understand and practice the present invention.

REFERENCES

1. Ahn S & Fessler J A 2003, "Globally convergent image reconstruction for emission tomography using relaxed ordered subsets algorithms", *IEEE Trans. Med. Imag.*, 22, 613.
2. Biemond J, Lagendijk R L & Mersereau R M 1990, "Iterative Methods for Image Deblurring", Proc. IEEE, 78, 856.
3. Cauchy A 1821, *Oeuvres* 2, III, 373.
4. Dirac P 1958, *Principles of Quantum Mechanics*, $4^{th}$ ed., (Oxford: Clarendon Press), p. 58.
5. Du Q, Faber V & Gunzburger M 1999, "Centroidal Voronoi Tessellations: Applications and Algorithms", SIAM Rev., 41, 637.
6. Fisher R A 1912, "On an Absolute Criterion for Fitting Frequency Curves", Messenger Math., 41, 155.
7. Fisher R A 1922, "On the Mathematical Foundations of Theoretical Statistics", Phil. Trans. Roy. Soc. A, 222, 309.
8. Fox L, Huskey H D & Wilkinson J H 1948, "Notes on the Solution of Algebraic Linear Simultaneous Equations", Quart. J. Mech. Appl. Math., 1, 149.
9. Gauss C F 1809, Theoria Motus Corporum Coelestium in sectionibus conicis solem ambientium, English translation, 1963, Theory of Motion of the Heavenly Bodies (New York: Dover).
10. Golub G H & Van Loan C F 1996, Matrix Computations, 3rd ed. (Baltimore: Johns Hopkins University Press).
11. Hestenes M R & Stiefel E 1952, "Methods of Conjugate Gradients for Solving Linear Systems", J. Res. Nat. Bur. Standards, 49, 409.
12. Ju L, Du Q & Gunzburger M 2002, "Probabilistic Methods for Centroidal Voronoi Tessellations and their Parallel Implementations", Parallel Computing, 28, 1477.
13. Liu Y, Wang W, Lévy B, Sun F, Yan D-M, Lu L & Yang C 2009, "On Centroidal Voronoi Tessellation—Energy Smoothness and Fast Computation", *ACM Trans. Graphics* 28, Article 101.
14. Piña R K & Puetter R C 1993, "Bayesian Image Reconstruction: the Pixon and Optimal Image Modeling" *Publ. Astron. Soc. Pacific* 105, 630.

15. Poisson S D 1837, Probabilité des Jugements en Matière Criminelle et en Matière Civile, Précédées des Règles Générales du Calcul des Probabilités (Paris: Bachelier), p. 206.
16. Press W H, Teukolsky S A, Vetterling W T & Flannery B P 2007, Numerical Recipes, 3rd ed., (Cambridge: Cambridge University Press).
17. Puetter R C, Gosnell T R & Yahil A 2005, "Digital Image Reconstruction: Deblurring and Denoising", Annu. Rev. Astron. Astrophys., 43, 139.
18. Puetter R C & Yahil A 1999, "The Pixon Method of Image Reconstruction", in *Astronomical Data Analysis Software and Systems VIII*, Mehringer D M, Plante R L & Roberts D A, eds., *ASP Conference Series*, 172, 307.
19. Saad Y 2003, Iterative Methods for Sparse Linear Systems, 2nd ed. (Philadelphia: SIAM).
20. Schwarz H A 1888, "Über ein Flächen kleinsten Flächeninhalts betreffendes Problem der Variationsrechnung", *Acta Societatis Scientiarum Fennicae* 45, 318.
21. Voronoi G 1908, "Nouvelles Applications des Paramètres Confirms à la Théorie des Formes Quadratiques", Journal für die Reine and Angewandte Mathematik 133, 97.

The invention claimed is:

1. A computer-implemented method for removing noise from a signal of a target object, the computer-implemented method comprising:
   receiving an input signal from a source system, the input signal comprising image data identifying a target object and a plurality of parameters, and further comprising a noise portion, wherein the image data is selected from a group consisting of X-ray, CT, emission tomography, SPECT and PET, and the target object comprises image data of a body part of a patient;
   selecting an initial subset of parameters from the plurality of parameters;
   estimating a nonparametric probability distribution function (pdf) from the received input signal which comprises a linear combination of functions;
   generating a quadratic likelihood function (QLF) based on the nonparametric PDF estimated including the linear combination of functions;
   determining a fit of the initially selected subset of parameters to the data identifying the target object, based on the QLF;
   in response to the determined fit of the initially selected subset of parameters being below a predetermined threshold, iteratively optimizing parameters by selecting a new subset of parameters from the plurality of parameters and determining a fit of the new subset of parameters, until the determined fit satisfies the predetermined threshold; and
   generating an output signal comprising a reconstructed signal of the target object constructed using the new subset of iteratively optimized parameters.

2. The computer-implemented method of claim 1, wherein the data comprises weights $w_i$ and the QLF has the form $$L = \int dx \left[ \frac{1}{2} f(x)^2 - f(x) \sum_i w_i \delta(x - x_i) \right].$$

3. The computer-implemented method of claim 1, further comprising calculating a source term using the data and basis functions.

4. The computer-implemented method of claim 3, wherein the QLF is obtained by:
   computing a Gram matrix using the basis functions; and
   combining the Gram matrix, the parameters and the source tem' to produce the QLF.

5. The computer-implemented method of claim 1, wherein the output comprises a 2D, 3D, or 4D image representation of the target object displayed at a graphical user interface.

6. The computer-implemented method of claim 1, wherein the image data is taken in at least two planes, and wherein the output comprises a 3D representation.

7. The computer-implemented method of claim 1, wherein the image data is taken in a least two planes and further comprises time, and wherein the output comprises a 4D representation.

8. A system for modeling of data describing a target object contained in an input signal, the system comprising:
   a computer-readable medium;
   a parameter optimization processor coupled to the computer-readable medium; and
   a communication interface coupled to the parameter optimization processor and adapted to receive and transmit electronic representations of reconstructed models signals to and from the parameter optimization processor, respectively, the computer-readable medium having stored thereon software instructions that, when executed by the parameter optimization processor, cause the parameter optimization processor to perform operations including:
   receive the input signal from a source system configured to collect object data, the input signal comprising image data identifying a target object and a plurality of parameters, and further comprises noise, wherein the image data is selected from a group consisting of X-ray, CT, emission tomography, SPECT and PET, and the target object comprises image data of a body part of a patient;
   select an initial subset of parameters corresponding to the target object from the plurality of parameters;
   estimate a nonparametric probability distribution function comprising (pdf) from the received input signal which comprises a linear combination of functions;
   generate a quadratic likelihood function (QLF) based on the nonparametric PDF including the linear combination of functions;
   determine a fit of the initially selected subset of parameters to the data identifying the target object, based on the QLF;
   in response to the determined fit of the initially selected subset of parameters being below a predetermined threshold, iteratively optimize parameters by selecting a new subset of parameters from the plurality of parameters and determining a fit of the new subset of parameters, until the determined fit satisfies the predetermined threshold; and
   generate an output signal comprising a signal of the target object constructed using the new subset of iteratively optimized parameters.

9. The system of claim 8, wherein the data comprises weights w; and the QLF has the form $$L = \int dx \left[ \frac{1}{2} f(x)^2 - f(x) \sum_i w_i \delta(x - x_i) \right].$$

10. The system of claim 8, further comprising calculating a source term using the data and basis functions.

11. The system of claim 10, wherein the QLF is obtained by:
   computing a Gram matrix using the basis functions; and
   combining the Gram matrix, the parameters and the source term to produce the QLF.

12. The system of claim 8, wherein the output signal comprises a 2D, 3D or 4D image representation of the target object displayed at a graphical user interface.

13. The system of claim 8, wherein the image data is taken in at least two planes, and wherein the output comprises a 3D representation.

14. The system of claim 8, wherein the image data is taken in a least two planes and further comprises time, and wherein the output comprises a 4D representation.

15. A method of generating a reconstructed image of a target object from an input signal having a data component and a noise component, the method comprising:
   receiving the input signal from an image source system, the input signal comprising image data identifying a target object and a plurality of parameters, and further comprising a noise portion, wherein the image data is selected from a group consisting of X-ray, CT, emission tomography, SPECT and PET, and the target object comprises image data of a body part of a patient;
   selecting an initial subset of parameters from the plurality of parameters;
   estimating a nonparametric probability distribution function (pdf) from the received input signal which comprises a linear combination of functions;
   generating a quadratic likelihood function (QLF) based on the nonparametric PDF including the linear combination of functions;
   determining a fit of the initially selected subset of parameters to the data identifying the target object, based on the QLF;
   in response to the determined fit of the initially selected subset of parameters being below a predetermined threshold, iteratively optimizing parameters by selecting a new subset of parameters from the plurality of parameters and determining a fit of the new subset of parameters, until the determined fit satisfies the predetermined threshold; and
   generating an output signal comprising a display of reconstructed image of the target object based on the new subset of iteratively optimized parameters.

16. The method of claim 15, wherein the input signal comprises first plane image data and second plane image data, and the output comprises displaying a three-dimensional image of the target object.

17. The method of claim 16, wherein the data comprises weights w; and the QLF has the form $$L = \int dx \left[ \frac{1}{2} f(x)^2 - f(x) \sum_i w_i \delta(x - x_i) \right].$$

18. The method of claim 15, further comprising calculating a source term using the data and basis functions.

19. The method of claim 18, wherein the QLF is obtained by:
   computing a Gram matrix using the basis functions; and
   combining the Gram matrix, the parameters and the source term to produce the QLF.

20. The computer-implemented method of claim 1, wherein the QDF comprises a form $$L = \int dx \left[ \frac{1}{2} f(x, \theta)^2 - f(x, \theta) \sum_i \delta(x - x_i) \right],$$

where $\theta$ represents the parameters, x represents the positions of the observations, and f (x, $\theta$) is the pdf.

* * * * *